US011127139B2

(12) United States Patent
Zhang et al.

(10) Patent No.: US 11,127,139 B2
(45) Date of Patent: Sep. 21, 2021

(54) ENHANCED SEMANTIC SEGMENTATION OF IMAGES

(71) Applicant: ADOBE INC., San Jose, CA (US)

(72) Inventors: Jianming Zhang, Campbell, CA (US); Zhe Lin, Fremont, CA (US)

(73) Assignee: ADOBE INC., San Jose, CA (US)

( * ) Notice: Subject to any disclaimer, the term of this patent is extended or adjusted under 35 U.S.C. 154(b) by 22 days.

(21) Appl. No.: 16/574,513

(22) Filed: Sep. 18, 2019

(65) Prior Publication Data

US 2021/0082118 A1  Mar. 18, 2021

(51) Int. Cl.
*G06T 7/11* (2017.01)
*G06N 3/04* (2006.01)

(52) U.S. Cl.
CPC ............ *G06T 7/11* (2017.01); *G06N 3/0454* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| 10,460,214 B2 | 10/2019 | Lu et al. | |
| 10,713,794 B1* | 7/2020 | He | G06N 3/0454 |
| 2015/0206315 A1* | 7/2015 | Price | G06T 7/162 |
| | | | 382/180 |
| 2018/0101957 A1* | 4/2018 | Talathi | G06T 7/10 |
| 2018/0108137 A1* | 4/2018 | Price | G06T 7/11 |
| 2018/0268220 A1* | 9/2018 | Lee | G06K 9/00979 |
| 2019/0051056 A1* | 2/2019 | Chiu | G06T 7/136 |
| 2019/0340462 A1 | 11/2019 | Pao et al. | |
| 2020/0134833 A1* | 4/2020 | Biswas | G06K 9/342 |

(Continued)

OTHER PUBLICATIONS

Swarnendu Ghosh, "Understanding Deep Learning Techniques for Image Segmentation", Aug. 2019, ACM Computing Surveys, vol. 52, No. 4, Article 73, pp. 1-22.*

(Continued)

*Primary Examiner* — Omar S Ismail
(74) *Attorney, Agent, or Firm* — Shook, Hardy & Bacon L.L.P.

(57) ABSTRACT

Enhanced methods and systems for the semantic segmentation of images are described. A refined segmentation mask for a specified object visually depicted in a source image is generated based on a coarse and/or raw segmentation mask. The refined segmentation mask is generated via a refinement process applied to the coarse segmentation mask. The refinement process correct at least a portion of both type I and type II errors, as well as refine boundaries of the specified object, associated with the coarse segmentation mask. Thus, the refined segmentation mask provides a more accurate segmentation of the object than the coarse segmentation mask. A segmentation refinement model is employed to generate the refined segmentation mask based on the coarse segmentation mask. That is, the segmentation model is employed to refine the coarse segmentation mask to generate more accurate segmentations of the object. The refinement process is an iterative refinement process carried out via a trained neural network.

20 Claims, 8 Drawing Sheets
(4 of 8 Drawing Sheet(s) Filed in Color)

(56) References Cited

U.S. PATENT DOCUMENTS

2020/0364873 A1* 11/2020 Bradski .................... G06T 5/20
2020/0364878 A1* 11/2020 Bradski .................. G06T 7/194

OTHER PUBLICATIONS

Shu Kong,"Recurrent Scene Parsing with Perspective Understanding in the Loop",Dec. 6, 2017,Computer Vision and Pattern Recognition,arXiv:1705.07238 [cs.CV],pp. 1-8,11,15,16.*

Erzhuo Che,"Object Recognition, Segmentation, and Classification of Mobile Laser Scanning Point Clouds: A State of the Art Review",Feb. 16, 2019,Sensors,www.mdpi.com/journal/sensors,pp. 1-6.*

Yadan Luo,"Coarse-to-Fine Annotation Enrichment for Semantic Segmentation Learning", Oct. 22, 2018, CIKM'18, Oct. 22-26, 2018, Torino, Italy,Association for Computing Machinery, pp. 237-244.*

Chen, L. C., Papandreou, G., Kokkinos, I., Murphy, K., & Yuille, A. L. (2017). Deeplab: Semantic image segmentation with deep convolutional nets, atrous convolution, and fully connected crfs. IEEE transactions on pattern analysis and machine intelligence, 40(4), 834-848.

He, K., Sun, J., & Tang, X. (Sep. 2010). Guided image filtering. In European conference on computer vision (pp. 1-14). Springer, Berlin, Heidelberg.

Pinheiro, P. O., Lin, T. Y., Collobert, R., & Dollár, P. (Oct. 2016). Learning to refine object segments. In European Conference on Computer Vision (pp. 75-91). Springer, Cham.

* cited by examiner

ENHANCED SEMANTIC SEGMENTATION OF IMAGES

BACKGROUND

Semantic segmentation of images involves determining which pixels in an image are included in a visual depiction of a specified object included in the image. Conventional neural networks (NN) may be trained to generate a segmentation mask for a specified object depicted in an image. In general, a segmentation mask may operate on the image, wherein the masking operation discriminates between pixels that do contribute to the object's visual depiction and pixels that do not contribute to the object's visual depiction. Such segmentation masks may be employed to "mask" (e.g., inhibit the transmission of the data encoded in the masked pixels) a portion of the pixels that do not contribute to the visual depiction of the object. The portion of the image's pixels that remain after the masking operation may be pixels that contribute to the visual depiction.

However, segmentation masks generated by conventional NNs are often raw and/or coarse segmentation masks. That is, conventionally generated segmentation masks may be significantly inaccurate when employed to discriminate between pixels that do contribute to the object's visual depiction and pixels that do not contribute to the object's visual depiction. More specifically, applying (via a masking operation) a conventionally-generated segmentation mask to an image may result in a significant amount of both type I and type II pixel classification errors. Type I classification errors may include false positive errors where pixels that do not contribute to the object's visual depiction are not masked by the coarse segmentation mask. Type II classification errors may include false negative errors where pixels that do contribute to the object's visual depiction are masked by the coarse segmentation mask.

The complexity of an object's shape may contribute to the difficulty in generating an accurate segmentation mask. That is, the coarse segmentation masks generated by conventional NNs for objects may be even more inaccurate (e.g., greater numbers of type I and/or type II classification errors) for objects of complex, non-uniform, and/or asymmetrical shapes, than for objects with simple, uniform, and/or symmetrical shapes. Thus, the employment of conventional NNs may be of limited utility for the semantic segmentation of visually depicted objects of arbitrary shape.

SUMMARY

The technology described herein is directed towards enhanced methods and systems for the semantic segmentation of images. More particularly, the embodiments are directed towards generating a refined segmentation mask for a specified object visually depicted in a source image. The refined segmentation mask may be a refinement of a raw and/or a coarse segmentation mask for the visually depicted object. The refinement process may correct at least a portion of both type I and type II errors, as well as refine boundaries of the specified object, associated with the raw and/or coarse segmentation mask. Thus, the refined segmentation mask may provide a more accurate segmentation of the object than the raw and/or coarse segmentation mask. A segmentation refinement model may be employed to generate the refined segmentation mask based on the raw and/or coarse segmentation mask. That is, the segmentation model may be employed to refine the coarse segmentation mask to generate more accurate segmentations of the object. The refinement process may be an iterative refinement process.

In one non-limiting embodiment of a method for semantic segmentation may include receiving source image data that encodes a source image. The source image data may include a set of pixels and a first subset of the set of pixels is associated with a visual depiction an object within the source image. A coarse segmentation mask may be generated via employment of a coarse segmentation model. The coarse segmentation mask may be employed via a masking operation to coarsely segment the source image data by identifying a second subset of the set of pixels. The second subset of pixels may be a coarse approximation of the first subset of pixels. A segmentation refinement model may be employed to iteratively generate a refined segmentation mask based on a concatenation of the source image data and the coarse segmentation mask. Via another masking operation, the refined segmentation mask may be employed to finely segment the source image data by identifying a third subset of the set of pixels. The third subset of pixels may be a closer approximation of the first subset of pixels than the coarse approximation of the second subset of pixels.

In some embodiments, the source image and the coarse segmentation mask may be of a first image resolution. Employing the segmentation model to iteratively generate the refined segmentation mask may include generating downsized image data that encodes a downsized image of the source image. The downsized image may be of a second image resolution that is less than the first image resolution of the source image. A downsized segmentation mask may be generated by downsizing the coarse segmentation mask. The downsized segmentation mask may be of the second image resolution. A concatenation of the downsized image data and the downsized segmentation mask may be generated. The segmentation refinement model may be employed to generate a first intermediate segmentation mask based on the concatenation of the downsized image data and the downsized segmentation mask. The first intermediate segmentation mask may be of the second image resolution. The refined segmentation mask may be generated based on an upsizing operation on the first intermediate segmentation mask. The refined segmentation mask may be of the first image resolution.

In such embodiments, generating the refined segmentation mask based on the upsizing operation on the first intermediate segmentation mask may include generating midsized image data that encodes a midsized image of the source image. The midsized image may be of a third image resolution that is less than the first image resolution of the source image and greater than the second image resolution of the downsized image. A midsized segmentation mask may be generated via the upsizing operation on the first intermediate segmentation mask. The midsized segmentation mask may be of the third image resolution. A concatenation of the midsized image data and the midsized segmentation mask may be generated. The segmentation refinement model may be employed to generate a second intermediate segmentation mask based on the concatenation of the midsized image data and the midsized segmentation mask. The second intermediate segmentation mask may be of the third image resolution. The refined segmentation mask may be generated based on an upsizing operation on the second intermediate segmentation mask.

In some embodiments, the segmentation refinement model is implemented by a convolutional encoder-decoder neural network. In such embodiments, the segmentation refinement model may be trained via supervised machine learning methods. For example, a training image and a corresponding ground-truth (GT) segmentation mask may be accessed and/or retrieved. A coarse segmentation model may be employed to generate a training coarse segmentation mask for the training image. A difference map may be generated based on a comparison of the training coarse segmentation mask and the GT segmentation mask. The difference map may indicate one or more differences between the training coarse segmentation mask and the GT segmentation mask. The difference map, the training coarse segmentation mask, the training image, and the GT segmentation mask may be employed to update and/or train the segmentation refinement model.

In still further training embodiments, employing the difference map, the training coarse segmentation mask, the training image, and the GT segmentation mask to update and/or train the segmentation refinement model may include generating a sampled patch of the training image, a corresponding sampled patch of the training coarse segmentation mask, and a corresponding sampled patch of the GT segmentation mask. Each of the sampled patch of the training image, the corresponding sampled patch of the training coarse segmentation mask, and the corresponding sampled patch of the GT segmentation mask are associated with a region of the difference map that indicates a first difference of the one or more differences between the training coarse segmentation mask and the GT segmentation mask. The first difference may be greater than a predefined difference threshold. The sampled patch of the training image, the corresponding sampled patch of the training coarse segmentation mask, and the corresponding sampled patch of the GT segmentation mask may be employed to update and/or train the segmentation refinement model.

In at least one training embodiment, employing the sampled patch of the training image, the corresponding sampled patch of the training coarse segmentation mask, and the corresponding sampled patch of the GT segmentation mask to update and/or train the segmentation refinement model may include resizing each of the sampled patch of the training image, the corresponding sampled patch of the training coarse segmentation mask, and the corresponding sampled patch of the GT segmentation mask to a predefined size. The segmentation refinement model may be employed to generate a training refined segmentation mask, based on a concatenation of the resized sampled patch of the training image and the resized corresponding sampled patch of the training coarse segmentation mask. A value of loss function may be determined and/or computed based on a comparison of the training refined segmentation mask and the resized corresponding sampled patch of the GT segmentation mask. The segmentation refinement model may be updated based on the value of the loss function.

BRIEF DESCRIPTION OF THE DRAWINGS

The patent or application file contains at least one drawing executed in color. Copies of this patent or patent application publication with color drawing(s) will be provided by the Office upon request and payment of the necessary fee

DETAILED DESCRIPTION

Figure 1:
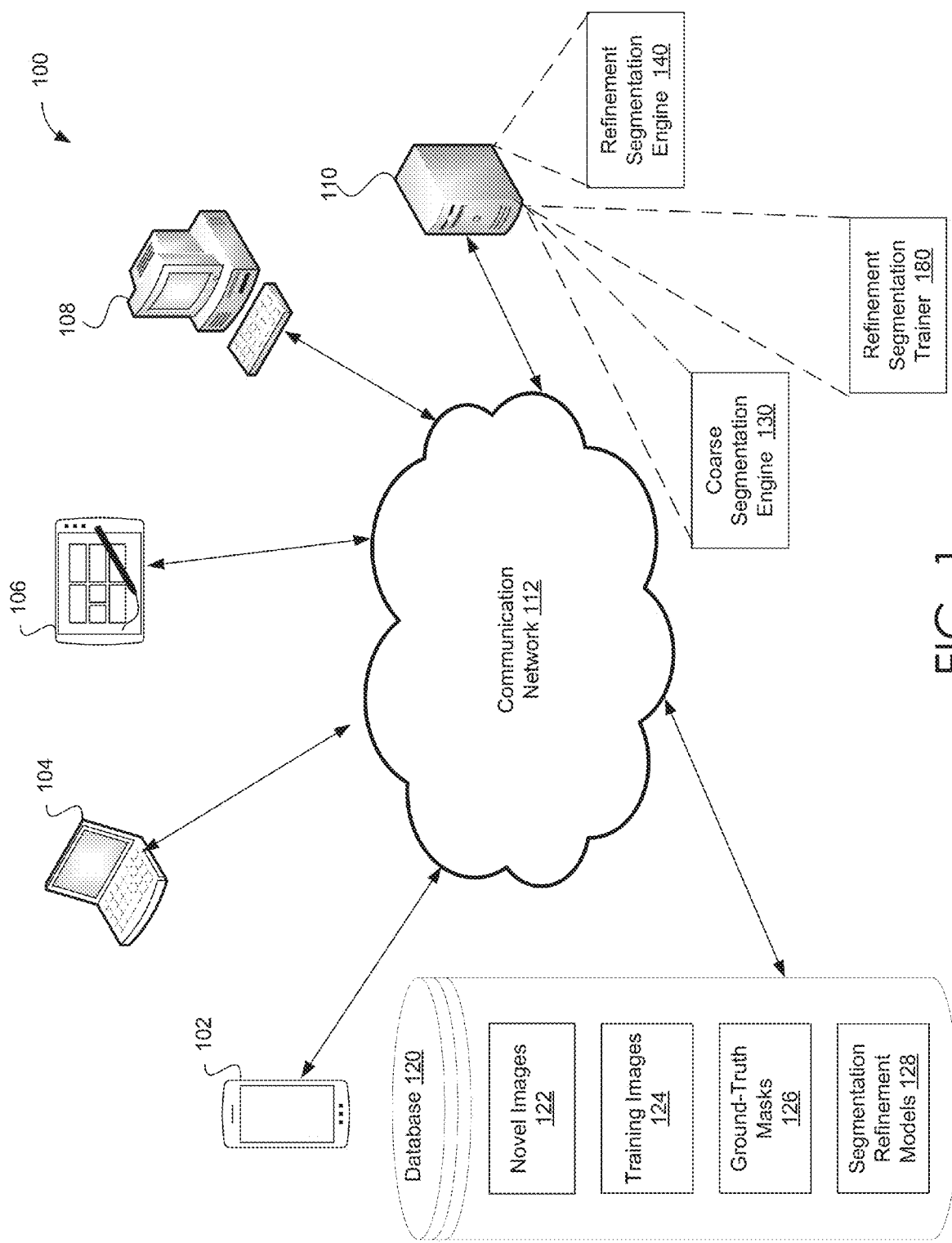
FIG. 1 illustrates an enhanced semantic segmentation system 100 implementing various embodiments presented herein.

As used herein, the term "set" may be employed to refer to an ordered (i.e., sequential) or an unordered (i.e., non-sequential) collection of objects (or elements), such as but not limited to data elements (e.g., data events, data objects, states of a model, states of automaton, pixels of an image, and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

As used herein, the term "image data" may refer to structured or unstructured data. The image data may encode an image. The term "data pixel" (or simply "pixel") may refer to discretized data elements included in image data. Thus, image data may include a set of data pixels (or simply a set of pixels). The term "image pixel" may refer to a discretized region of the encoded image. Each pixel of the image data may correspond to an image pixel of the encoded image. Thus, there may exist a mapping between the data pixels (or simply pixels) of the image data to image pixels of the encoded image. The mapping may be a one-to-one mapping.

A data pixel may be set to one or more values. The one or more values of a data pixel may encode the visual appearance of the corresponding image pixel. The one or more values may include one or more scalar values. The one or more values may include one or more color values, luminosity values, or the like. Pixels may be multichannel pixels. For example, a pixel may include multiple channels to encode multiple values for multiple colors (e.g., RGB pixels). On one non-limiting embodiment, a pixel may include 3 channels (e.g., RGB), where each channel has a bit depth of 8 bits. In such an embodiment, the value of each channel may be set for any integer value between 0 and 255. The pixels in such multi-channel embodiments may be "multi-color" pixels.

In other embodiments, the pixels may be single channel pixels (e.g., monochrome pixels), where the scalar value of a pixel indicates an intensity or luminosity value for the pixel. In such embodiments, the encoded image may be a "greyscale" image. The pixel values may be normalized to range between 0 and 1. In such embodiments, image data may include a "probability map." In some embodiments, the image data may be binary image data, where the value of each single channel pixel is set to either 0 or 1. In such embodiments, the image may be a "black and white" image, where pixels with a value of 1 are "white pixels," and pixels with a value of 0 are "black pixels." As noted above, the one or more values of a data pixel may encode the visual appearance (e.g., color, grey tone, black or white, and the like) of the corresponding image pixel.

The set of pixels included in image data may be structured as a one-dimensional (1D) or a two-dimensional (2D) data array of pixels. In a 2D array embodiments, the pixels may be arranged into rows and columns, which correspond to the rows and columns of the image pixels of the encoded image. The "resolution" of image data (or of the encoded image) may refer to the number and arrangement of the pixels included in the set of pixels. For example, the resolution of image data may include two scalar integer values, where a first integer scalar quantity (e.g., m) may indicate the number of pixels included in a row of pixels (e.g., the number of columns of pixels included in the image data) and a second scalar integer value (e.g., n) may indicate the number of pixels included in a column of pixels (e.g., the number of rows of pixels included in the image data. Thus, notation such as m×n may indicate the resolution of image data (or the encoded image), where each of m and n are positive integers, and m refers to the column depth and n refers to the row depth of the image data. Thus, the resolution of image data may be a 2D value, where each dimension is set to a positive integer. First image data may include a first resolution (e.g., m×n) and image data may include a second resolution (e.g., m'×n'). The first resolution of the first image data may be greater than the second resolution of the second image data if m>m' and n>n'.

As used throughout, the "size" of image data (or the encoded image) may refer to at least one of the dimensions of the resolution of the image data (or the encoded image). Thus, in the above example, the size of the first image data is greater than the size of the second image data because m>m' and n>n'. Or conversely, the size of the second image data is less than the size of the first image data. Image data (and the corresponding encoded image) may be subject to "resizing" and/or "rescaling" operations. A resizing and/or rescaling operation may include increasing or decreasing at least one of the dimensions of the resolution or size of the image data. In some embodiments, each dimension of the resolution may be proportionately and/or uniformly resized and/or rescaled. For example, in a uniform rescaling operation, the values of each of m and n may be increased (or decreased) by a fixed proportion (e.g., 50%).

An "upsizing" or "upscaling" operation may include an operation where the values for m, n, or both m and n are increased. A "downsizing" or "downscaling" operation may include an operation where the values for m, n, or both m and n are decreased. Thus, the image data (or the encoded image) may be "downsized" or "upsized," via scaling operations. Image data (and encoded images) may be referred to via the relatively resolution or size. In a non-limiting example, image data may have a native resolution of 1024× 1024. The image data may be downsized, via a downsizing operation, to generate downsized image data which encodes a downsized image with a resolution of 320×320. The downsized image data may be upsized, via an upsizing operation, to generate midsized image data which encodes a midsized image with a resolution of 640×640. The midsized image data may be upsized, via an upsizing operation, to generate upsized image data which encodes an upsized image with a resolution of 1024×1024. Note that terms such as "downsized," "midsized," and "upsized," may be relative (and not absolute) terms. The relative and exemplary values for m and n provided above are not meant to be limiting in any way, and other values may be employed for other resizing and/or rescaling operations. Various sampling (e.g., up-sampling and down-sampling), weighted averaging, interpolating, and/or other methods may be employed to the various resizing and/or rescaling operations.

A rescaling and/or resizing operation may be based on a relative or absolute scaling factor. A relative scaling factor may include a proportional change for each of the dimensions. For example, a relative scaling factor for a downsizing operation that includes decreasing the first dimension by 20% (reducing the number of pixels in the first dimension by 20%) and decreasing the second dimension by 50% (reducing the number of pixels in the second dimension by 50%) may be referenced as: (−0.20)×(−0.50). A relative scaling factor for an upsizing operation that includes increasing the first dimension by 30% (increasing the number of pixels in the first dimension by 30%) and increasing the second dimension by 10% (increasing the number of pixels in the second dimension by 10%) may be referenced as: (+0.30)× (+0.10). An absolute scaling factor may include an absolute resolution. For example, image data may have an initial resolution of 1024×1024. An absolute scaling factor for a downsizing operation, where the number of pixels in the first dimension is to be reduced from 1024 to 320 and the number of pixels in the second dimension is to be reduced from 1024 to 320 may be referenced as: 1024→320×1024→320. An absolute scaling factor for an upsizing operation, where the number of pixels in the first dimension is to be increased from 320 to 640 and the number of pixels in the second dimension is to be increased from 320 to 640 may be referenced as: 320→640×320→640.

A mapping may exist between the pixels of the first image data and resized image data. The mapping may be, but need not be, a one-to-one mapping. When downsizing and/or upsizing, the mapping may not be a one-to-one mapping. In the above example, multiple pixels of the first image data in the 1024×1024 resolution may correspond to correspond to a single pixel of the downsized image data in the 320×320 resolution. For example, the values of the multiple pixels of the first image data corresponding to the downsized image data may be averaged (e.g., weighted or unweighted averaging methods) to generate the value of the corresponding pixel of the downsized image. Thus, during a downsizing operation, multiple values of multiple pixels in the first image data may be "compressed" into a single value for a single pixel in the downsized image data. The data compression may be a lossless data compression. In other embodiments, the compression may be a lossless compression. A single pixel of the downsized image data may correspond to multiple pixels of the midsized image data in the 640×640 resolution. Thus, during an upsizing operation, a single value of a single pixel may be "decompressed," "expanded," or "exploded" into multiple values for multiple pixels of the upsized image data.

The encoded image may be a visual image that includes a visual depiction of one or more objects. The encoded image may be a rendering of a physical or tangible scene, a virtual scene (e.g. a scene from a virtual-reality (VR) environment), or a combination thereof (e.g., a scene from an augmented-reality (AR) environment). Thus, visually depicted object may be a physical or tangible object (e.g., a photographed human, pet, vehicle, sky, and the like), a virtual object (e.g., an animated video game character, a virtual dashboard, or the like), or a combination thereof (e.g., a human interacting with the virtual dashboard or a virtual character interacting with the tangible pet).

A first subset of the set of pixels of image data may contribute to the visual depiction of a specific object within the image. Likewise, a second subset of pixels of the image data may not contribute to the visual depiction of the specific object. The first and second subsets of pixels may be disjoint sets of pixels. In some embodiments, the first and second subsets of pixels may be complementary subsets of pixels. That is, the second subset of pixels may be the complement of the first subset of pixels and the first subset of pixels may be the complement of the second subset of pixels.

As used herein, the term "segmentation mask" may refer to structured or unstructured data that, via a masking operation, may be employed to provide at least an approximate discrimination between the subset of pixels that contributes to the visual depiction of a specified object and the subset of pixels that do not contribute to the specified object's visual depiction. Thus, a segmentation mask may be employed to generate at least an approximate discrimination between a subset of pixels that contribute to the object's visual depiction and a subset of pixels that do not contribute to the object's visual depiction. A segmentation mask may include image data with a resolution equivalent to (or at least substantially similar to) the image data that the segmentation mask will operate on via a masking operation. The masking operation on first image data may include employing the segmentation mask (second image data) as an "overlay" or "mask" on the first image data, wherein the pixel values of the segmentation mask indicate a "transmission" value for the values of the corresponding (and underlying) pixel values of the first image data. A segmentation operation may "mask" (e.g., by blocking the transmission of) the subset of pixels that do not contribute to the object's visual depiction. Thus, a segmentation mask may be generated for a specific set of image data and for a specific object visual depicted in the encoded image.

In one embodiment, the segmentation mask may be a binary segmentation mask where pixels takes on a binary value of 0 or 1. Thus, each pixel in binary segmentation mask may be encoded via a single bit (e.g., a bit depth of 1). A binary segmentation mask may encode a black and white image. The "black" pixels (e.g., pixels with a value of 0) of the segmentation mask may allow for no transmission (e.g., mask off) of the corresponding pixel values of the first image data. The "white" pixels (e.g., pixels with a value of 1) of the segmentation mask may allow for the full transmission of the corresponding pixel values of the first image data. Thus, for a "perfectly" accurate binary segmentation mask, each pixel that corresponds to a pixel of the first image data that contributes to the object's visual depiction may be a "white" pixel, and each pixel that corresponds to a pixel of the first image data that does not contribute to the object's visual depiction may be a "black" pixel.

In other embodiments, a segmentation mask may include greyscale image data. Such embodiments may be referred to as a "soft" segmentation mask, where the pixel values are set to a greyscale value between 0 and 1 (or alternatively, the pixel values may be normalized to a range spanning 0 and 1). The normalized pixel values indicates a transmission probability. That is, the pixel values may indicate a determined probability (or likelihood) that the corresponding pixels of the first image data do contribute to the object's visual depiction. Thus, a segmentation mask may be referred to as probabilistic image data and/or a probability map. In an example where image data encodes a visual depiction of the sky, along with other objects, a user may wish a segment pixels encoding the visual depiction of the sky from pixels that encode the visual depiction of the other objects. A corresponding "soft," "non-binary," "greyscale," or "probabilistic" segmentation mask may highlight the "sky" pixels with high probability values (values close to 1, such as light or white pixels), while suppressing the "non-sky" pixels with low probability values (values close to 0, such as dark or black pixels). "Fuzzy" portions of the segmentation mask may include pixels where the probability values closer to 0.5, rather than 0 or 1. The probability values may be a classification probability (e.g., a determination of the probability that the pixel does or does not contribute to the object's visual depiction). In at least one embodiment, a segmentation mask may be a multichannel segmentation mask.

The image encoded by a segmentation mask may be referred to as a 'segmentation image." As noted above, for a binary (or "hard") segmentation mask, the encoded segmentation image may be rendered as a binary image (e.g., a black and white) image. The location of the "white" pixels in the binary segmentation image correspond to locations of the pixels in the source image data that contribute to the object's visual depiction. The location of the "black" pixels in the binary segmentation image correspond to locations of the pixels in the source image data that do not contribute to the object's visual depiction. For a soft, or probabilistic segmentation mask, the encoded segmentation image may be rendered as a greyscale image. The location of the "lighter-colored" pixels in the probabilistic segmentation image correspond to locations of the pixels in the source image data that have a high probability for contributing to the object's visual depiction. The location of the "darker-colored" pixels in the probabilistic segmentation image correspond to locations of the pixels in the source image data that have a low probability for contributing to the object's visual depiction. The location of the "grey-colored" pixels in the probabilistic segmentation image correspond to locations of the pixels in the source image data that more of an equal probability (e.g., a probability ranging from 0.2 to 0.7) for contributing or not contributing to the object's visual depiction. In at least one embodiment, the encoded segmentation image may be rendered as a color image.

The "accuracy" of a segmentation mask may refer to a volume of segmenting, labeling, and/or classifying the pixels of the corresponding image data. As noted above, a segmentation mask for image data and for the specified object visually depicted in the encoded image may be employed to (probabilistically) classify and/or label each pixel of the image data as either contributing to the specified object's visual depiction or not contributing to the specified object visual depiction. A segmentation mask may generate both type I and type II pixel classification errors. Type I classification errors may include false positive errors where pixels that do not contribute to the object's visual depiction are incorrectly classified (or labeled), via the masking operation, as contributing to the object's visual depiction. That is, type I errors occur in a masking operation when the inaccurate segmentation mask does not mask image data pixels that do not contribute to the object's visual depiction. Type II classification errors may include false negative errors where pixels that do contribute to the object's visual depiction are incorrectly classified (or labeled), via the masking operation, as not contributing to the object's visual depiction. That is, type II errors occur in a masking operation when the inaccurate segmentation mask does mask image data pixels that do contribute to the object's visual depiction.

Thus, the accuracy of a segmentation mask may refer to a relative amount of type I and/or type II errors. That is, a segmentation mask's accuracy may refer to a combination of the type I and the type II errors. The combination may be a weighted combination. The (weighted) combination of type I and type II errors of a "more accurate" segmentation mask may be less than the (weighted) combination of type I and type II errors of a "less accurate" segmentation mask. In the various embodiments, a less accurate segmentation mask may be referred to as a "coarse" or a "raw" segmentation mask, while a more accurate segmentation mask may be referred to as a "refined" segmentation mask.

A "patch" of image data may be generated from via of a "slicing operation" on the image data. That is, a patch of image data may include a contiguous subset of the pixels of the image data. The "slice" of the pixels may be a 2D slice of a contiguous 2D patch of pixels of the image data. A slicing operation may be similar to a "cropping operation," where a 2D contiguous patch (or "crop") of pixels are "cropped," "sliced," or "copied" from the image data. In one embodiment, a "patch" or "crop" of pixels may include a copy of the data pixels that are included in the patch of image data. A patch or crop may include a resolution (or size) such as but not limited to 256×256. A patch may be, but need not be, a "square" or "rectangular" cropping of the pixels. Because a segmentation mask is a form of image data, a patch or crop of pixels may be generated by cropping a segmentation mask. In some embodiments, a patch of a segmentation mask may be generated for a corresponding patch of the corresponding patch of pixels of the corresponding image data.

Two or more sets of image data may be concatenated via a concatenation operation on the two or more sets of image data. The concatenation operation may be a pixel-wise concatenation operation. A pixel-wise concatenation operation on a first set of image data and a second set of image data may enabled via a correspondence and/or mapping between the pixels of the first and second set of image data. Thus, the first and second sets of image data to be concatenated may include at least a similar size and/or resolution of data pixels. A concatenation of a first pixel of the first image data and a second pixel of the second image data may be a bit-wise concatenation of the bit values of the pixels. The symbol $\oplus$ may be employed to indicate a concatenation operation. For example, the first pixel (f) of the first image data may have a bit depth of 4 bits and the values of the four bits of the first pixel may be set to f=0110. The second pixel (s) of the second image data may also have a bit depth of 4 bits and the values of the four bits of the second pixel may be set to s=1010. The concatenation of the first and second pixels may result in a concatenated pixel of bit depth 8. The concatenation of the first and second pixels may be indicated as, f$\oplus$s=c, where c is a pixel of bit depth 8: f$\oplus$s=0110$\oplus$1010=01101010=c. Thus, a concatenation of corresponding bits may generate a new pixel of greater bit depth. The greater bit depth may be the sum of the bit depths of the concatenated pixels.

The various embodiments may concatenate corresponding source image data and segmentation mask image data. For example, source image data may be concatenated with a corresponding coarse segmentation mask. The pixel-wise concatenation of two or more image data sets may generate another set of image data, where the new image data has a bit depth that is the arithmetic sum of the bit depth of the individual sets of image data.

Briefly described, the various embodiments of the technology described herein are directed towards enhanced methods and systems for the semantic segmentation of images. More particularly, the embodiments are directed towards generating a refined segmentation mask for a specified object visually depicted in a source image. The refined segmentation mask may be a refinement of a raw and/or a coarse segmentation mask for the visually depicted object. The refinement process may correct at least a portion of both type I and type II errors, as well as refine boundaries of the specified object, associated with the raw and/or coarse segmentation mask. Thus, the refined segmentation mask may provide a more accurate segmentation of the object than the raw and/or coarse segmentation mask. A segmentation refinement model may be employed to generate the refined segmentation mask based on the raw and/or coarse segmentation mask. That is, the segmentation model may be employed to refine the coarse segmentation mask to generate more accurate segmentations of the object.

The segmentation refinement model may be implemented via one or more deep neural networks (e.g., a deep convolutional encoder-decoder neural networks). As described below, the segmentation refinement model may be trained via enhanced supervised machine learning (ML) methods. These enhanced supervised ML methods may selectively employ patches from training images and labeled ground-truth (GT) segmentation masks, rather than the entirety of the training images and GT segmentation masks. Employing patches (or crops) of the labeled training data, rather than entire images and segmentation masks provides significant reduction in the computational costs (e.g., both time and memory requirements) for the training of the segmentation refinement model. For example, by focusing the training on the patches or crops of pixel data that correspond to the biggest differences between the training coarse segmentation mask and the GT segmentation mask, significant computational resources are reduced in the training of the segmentation refinement model. Furthermore, because the training is focused on the patches that correspond to the biggest differences in the training data, when the trained model is employed to refine novel coarse segmentations masks for novel images, the trained model will be more effective in refining the areas of the novel coarse segmentation masks that include the most errors.

The refinement segmentation model may be iteratively employed to iteratively refine the coarse segmentation mask, and iteratively generate more and more accurate (e.g., "finer") segmentations of the specified object. For example, an execution of a first iteration of an enhanced segmentation method may employ the segmentation refinement model to generate a first refined segmentation mask based on the coarse segmentation mask. The first refined segmentation mask may provide a more accurate segmentation of the object than the coarse segmentation object. In an execution of a second iteration of the enhanced segmentation method, the first refined segmentation mask (which is a refinement of the coarse segmentation mask) may be treated as the coarse segmentation mask. That is, the execution of the second iteration of the method may employ the segmentation refinement model to generate a second refined segmentation mask based on the first refined segmentation mask. The second refined segmentation mask is a refinement of the first refined segmentation mask, such that the second refined segmentation mask provides a more accurate segmentation of the object than the first refined segmentation mask. The enhanced iterative method of semantic segmentation may be carried out until the refinement of the segmentation mask converges to any desired level of segmentation accuracy. Thus, the various embodiments may be employed to provide enhanced iterative semantic segmentation.

In at least one embodiment, the coarse segmentation mask may be generated via a conventional neural network (NN), such as but not limited to a conventional convolutional neural network (CNN). As noted above, the coarse segmentation masks generated by the conventional NN may be inaccurate. That is, the object segmentations generated by the coarse segmentation mask may include a significant number of type I and/or type II errors when discriminating between pixels that contribute to the object's visual depiction and pixels that do not contribute to the object's visual depiction. The refined segmentation mask generated by the various embodiments may significantly decrease the number of type I and/or type II errors of the segmentation.

Various conventional segmentation refinement methods may employ color-based post-processing techniques, such as dense Conditional Random Fields (CRFs) or guided filtering, to refine coarse segmentation masks. However, such color-based post-processing refinement techniques may not leverage semantic information encoded in the source image. In contrast, the segmentation refinement model employed by the various embodiments explicitly leverages such semantic information. Furthermore, color-based post-processing refinement techniques may be prone to type I and type II errors associated with image compression noise and color similarity between pixels contributing to the object's visual depiction and pixels not contributing to the object's visual depiction. As discussed throughout, various embodiments are not prone to such segmentation errors.

Example Operating Environment

FIG. 1 illustrates an enhanced semantic segmentation system 100 implementing various embodiments presented herein. Segmentation system 100 includes one or more various computing devices, such as but not limited to mobile smartphone computing device 102, laptop computing device 104, tablet computing device 106, desktop computing device 108, and server computing device 110. Computer devices 102-108 may be collectively referred to as client computing devices 102-108. Various embodiments of a computing device, such as but not limited to computing devices 102-110 are discussed in the context of computing device 700 of FIG. 7. Computing devices 102-110 may be communicatively coupled via communication network 112. Any of computing devices 102-110 may host, implement, and/or operate any of a coarse segmentation engine 130, a refinement segmentation engine 140, and/or a refinement segmentation trainer 180. In the non-limiting embodiment, illustrated in FIG. 1, server computing device 110 is hosting each of the coarse segmentation engine 130, the refinement segmentation engine 140, and the refinement segmentation trainer 180. In some embodiments, refinement segmentation engine 140 may operate as a server application. In such an embodiment, any of client computing devices 102-108 may host, implement and/or operate a client application that corresponds to the image rendering engine server application, e.g., system 100 may implement a client/server architecture.

Generally, coarse segmentation engine 130 may generate a coarse or raw segmentation mask for image data. Refinement segmentation engine 140 may refine the coarse segmentation mask and generate a refined segmentation mask, via a segmentation refinement model. Refinement segmentation trainer 180 may be employed to train one or more refinement segmentation models employed by the refinement segmentation engine 140. Refinement segmentation trainer 180 may employ various enhanced supervised machine learning (ML) training methods to train the segmentation refinement models.

System 100 may additionally include a database 120. Database 120 may be communicatively coupled to any of computing devices 102-110, as well as any of the coarse segmentation engine 130, the refinement segmentation engine 140, and the refinement segmentation trainer 180, via communication network 112. Database 120 may include one or more sub-databases and/or additional databases. In some embodiments, database 120 includes a database of novel images 122, a database of training images 124, a database of ground-truth (GT) masks 126, and a database of segmentation refinement models 128. Briefly, novel images 122 may include novel image data encoding novel and/or ne images to be semantically segmented. The image data stored in novel images 122 may be referred to as source image data and the encoded images may be referred to as source images. Training images 124 may include training image data encoding training images for the segmentation refinement models. GT masks 126 may include GT segmentation masks corresponding to one or more of the training images. A GT segmentation mask may be the "most accurate" available segmentation mask for a specified object visually depicted in the corresponding training image. A GT segmentation mask may be considered the "labelled ground-truth" for the various supervised ML discussed herein. Thus, together, training images 124 and corresponding GT masks 126 may comprise labeled training data, employed by refinement segmentation trainer 180, to train the various segmentation models. The one or more trained segmentation refinement models may be stored in segmentation refinement models 128 database.

Communication network 112 may be a general or specific communication network and may communicatively couple at least a portion of computing devices 102-110, enhanced recommendation engine 140, and any database included in database 120. Communication network 112 may be any communication network, including virtually any wired and/or wireless communication technologies, wired and/or wireless communication protocols, and the like. Communication network 112 may be virtually any communication network that communicatively couples a plurality of computing devices and storage devices in such a way as to computing devices to exchange information via communication network 112.

Coarse segmentation engine 130 may include virtually any engine that is enabled to generate a coarse or raw segmentation mask for a specified object visually depicted in a source image encoded in source image data, which may or may not be stored in novel images 122. Coarse segmentation engine 130 may employ a coarse segmentation model to generate the coarse segmentation mask. The coarse segmentation model may be implemented via a conventional convolutional neural network (CNN). Coarse segmentation engine 130 may employ a encoder-decoder CNN to generate a coarse segmentation mask for a specified image visually depicted in an image.

Figure 2A:
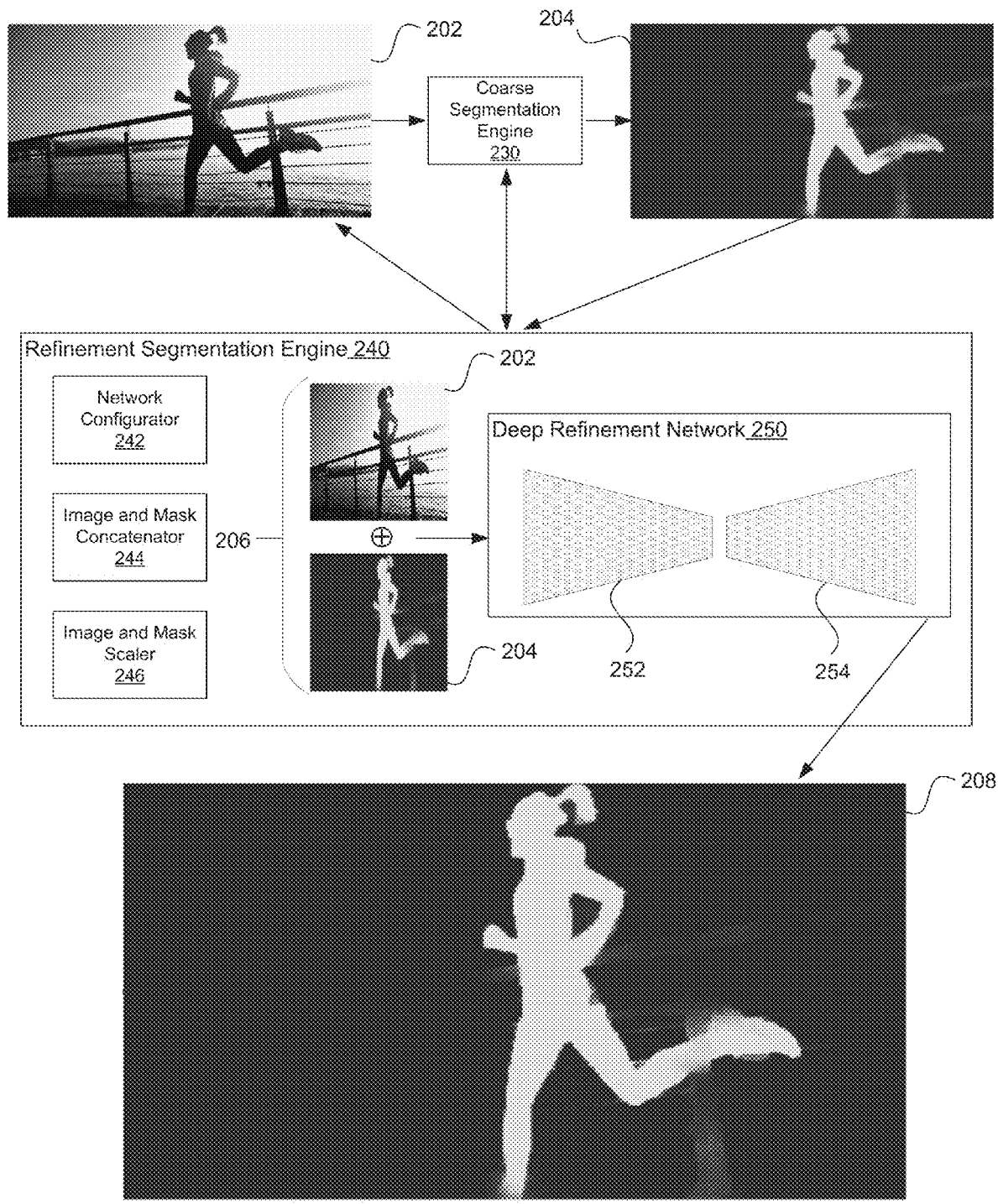
FIGS. 2A-2B illustrate non-limiting exemplary architectures and operations of an enhanced refinement segmentation engine, in accordance with the various embodiments.
Figure 2B:
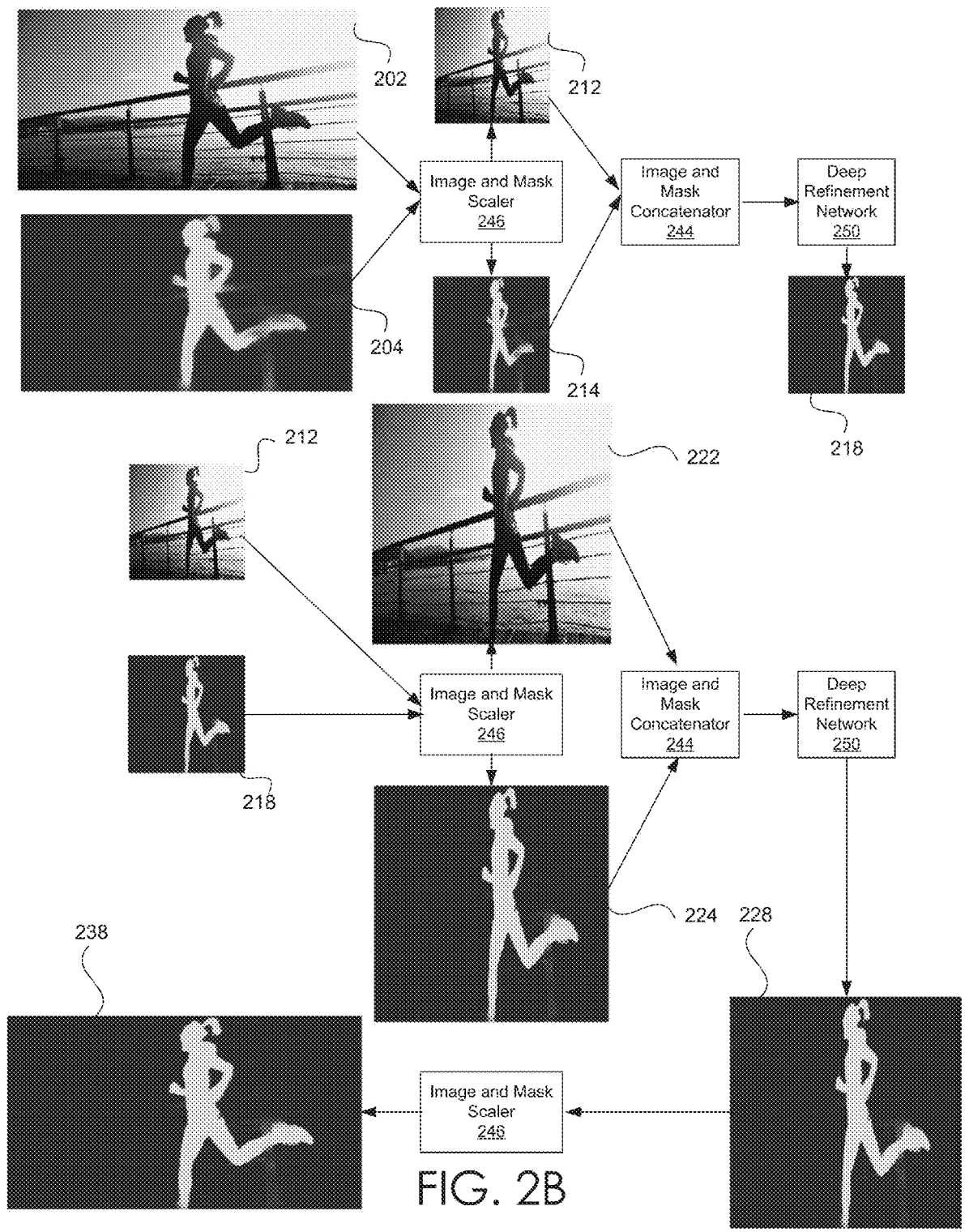

Various embodiments of enhanced refinement segmentation engine 140 are discussed in conjunction with at least FIGS. 2A-2B. However, briefly here, refinement segmentation engine 140 may employ a segmentation refinement model to refine a coarse segmentation mask, generated via coarse segmentation engine 130, to generate a refined segmentation mask for a specified object visually depicted in an encoded image. The segmentation refinement model may be implemented via an enhanced CNN. Various embodiments of refinement segmentation trainer 180 are discussed in conjunction with at least FIG. 3. However, briefly here, refinement segmentation trainer 180 may train, via enhanced supervised ML training methods, one or more segmentation refinement models employed by refinement segmentation engine 140.

Embodiments of an Enhanced Refinement Segmentation Engine

FIGS. 2A-2B illustrate non-limiting exemplary architectures and operations of an enhanced refinement segmentation engine 240, in accordance with the various embodiments. Enhanced refinement segmentation engine 240 may be similar to enhanced refinement segmentation engine 140 of FIG. 1. Briefly, refinement segmentation engine 240 may receive source image data and an indication of an object visually depicted in the source image encoded by the source image data. Refinement segmentation engine 240 may receive a coarse or raw segmentation mask for the object's visual depiction in the source image from coarse segmentation engine 230. Refinement segmentation engine 240 may refine the received coarse or raw segmentation mask and generate a refined segmentation mask. Coarse segmentation engine 230 may be similar to coarse segmentation engine 130 of FIG. 1. As such, coarse segmentation engine 203 may employ a coarse segmentation model to generate the coarse or raw segmentation mask. To refine the coarse or raw segmentation mask generated by coarse segmentation engine 230, refinement segmentation engine 240 may include at least one of network configurator 242, image and mask concatenator 244, and image and mask scaler 246, as discussed below.

Refinement segmentation engine 240 may employ a segmentation refinement model to refine the coarse segmentation mask. The refinement segmentation model may be implemented by a deep refinement network 250 included in and/or employed by refinement segmentation engine 240. Deep refinement network 250 may be a deep neural network (NN), such as but not limited to a convolutional neural network (CNN). Deep refinement network 250 may be an encoder-decoder style CNN. Thus, deep refinement network 250 may include one or more convolutional (or encoder) layers 252 and one or more deconvolutional (or decoder) layers 254. Deep refinement network 250 may operate to refine the coarse segmentation mask and generate a refined segmentation mask.

In general, network configurator 242 may be employed to select and/or configure deep refinement network 250 with a segmentation refinement model. In at least one embodiment, network configurator 242 may be employed to select and/or configure coarse segmentation engine 230 with a coarse segmentation model. Network configurator 242 may access one or more segmentation refinement models from segmentation refinement models database 128 of FIG. 1. Although not shown in FIG. 1, system 100 of FIG. 1 may include a similar database of coarse segmentation models. Network configurator 242 may have similar access to such a database of coarse segmentation models. The segmentation (refinement and/or coarse) models selected by network configurator 242 may be based on a type or class of object to segment. As discussed below, the input to deep refinement network 250 may be image data that includes a concatenation of the source image data and the coarse segmentation mask. Image and mask concatenator 244 is generally responsible for concatenating operation on the source image data and the coarse segmentation mask. As shown in FIG. 2A, the concatenation 206 of the source image 202 and the coarse segmentation image 204 may be employed as input for the deep refinement network 250. Image and mask scaler 246 is generally responsible for scaling and/or resizing operations on image data and segmentations masks as discussed throughout.

In various embodiments, the source image data may be referenced as I, and the coarse segmentation model, referenced as S, operates on the source image data via the operation: S(I). The segmentation refinement model may be referenced as R, which operates on the concatenation 206 via the operation: $R(I \oplus S(I))$. The concatenation operation may be a channel-wise concatenation operation. The refined segmentation mask may be referenced as M, thus the operations of the segmentation refinement process shown in FIG. 2A may be represented as: $M=R(I \oplus S(I))$.

Various operations of refinement segmentation engine 240 will now be discussed in conjunction with FIGS. 2A-2B. Refinement segmentation engine 240 may receive source image data that encodes a source image 202. Refinement segmentation engine 240 may receive an indication of an object visually depicted in the source image. The received indication may be an indication of a type and/or classification of the visually depicted object to segment in the image. For example, refinement segmentation engine 240 may receive an indication to segment the human jogging in source image 202. Refinement segmentation engine 240 may employ coarse segmentation engine 230 to generate a coarse or raw segmentation map for the source image 202 and the visually depicted jogging human.

Coarse segmentation engine 230 may generate and/or access a coarse segmentation model. In at least one embodiments, network configurator 242 may select a coarse segmentation model and configure a NN employed by coarse segmentation engine 230 with the selected coarse segmentation model. Network configurator 242 may select the coarse segmentation model based on type and/or classification of the visually depicted object to segment. Coarse segmentation engine 230 may receive source image 202 (or the corresponding source image data). Via employment of the coarse segmentation model, coarse segmentation engine 230 may generate and/or output a coarse segmentation mask for the source image 202 and for the specified object. As noted above, network configurator 242 may configure coarse segmentation engine 230 with a coarse segmentation model selected based on a type or classification of the visually depicted object to be segmented. The coarse segmentation engine 230 may employ the selected coarse segmentation model to generate and/or output a coarse or raw segmentation mask based on the source image data and the indication of the visually depicted object. The encoded coarse segmentation image 204 is shown as output of coarse segmentation engine 230. Note that coarse segmentation image 204 is a greyscale, soft, and/or probabilistic segmentation engine. The "fuzzy" areas in coarse segmentation image 204 indicate inaccuracies (e.g., type I and type II errors) in the coarse segmentation mask.

Figure 3:
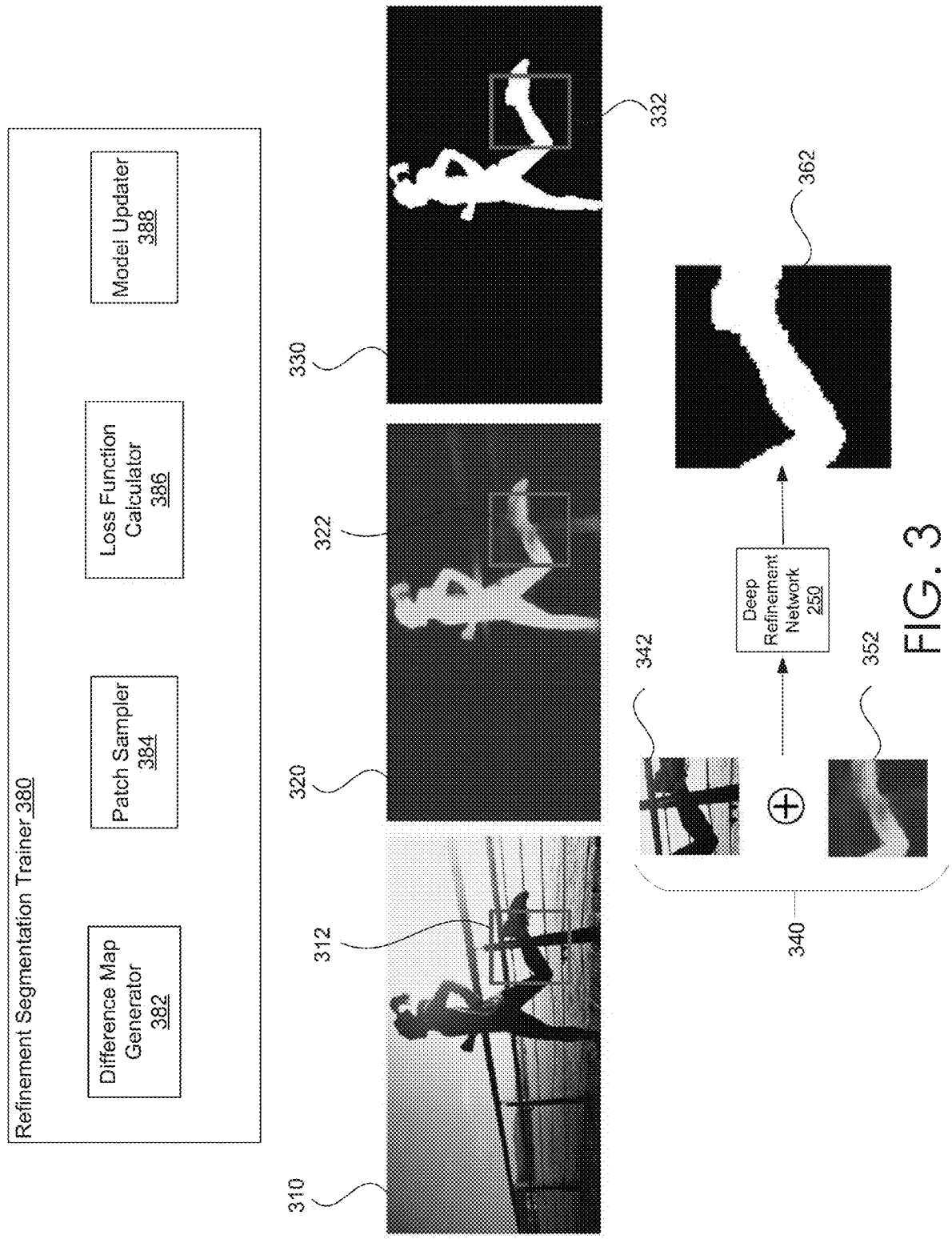
FIG. 3 illustrates non-limiting exemplary architectures and operations of an enhanced refinement segmentation trainer for training a segmentation refinement model, in accordance with the various embodiments.

As noted above, a refinement segmentation trainer, such as but not limited to refinement segmentation trainer 180 of FIG. 1 and/or refinement segmentation trainer 380 of FIG. 3 may be employed to generate and/or train a segmentation refinement model. Network configurator 242 may access and configure deep refinement network 250 with a segmentation refinement model. The selection of the segmentation refinement model may be based on the type and/or classification of the visually depicted object to segment.

Image and mask concatenator 244 may generate concatenated image data by concatenating source image 202 and segmentation image 204, via pixel-wise concatenation operations. The concatenation of source image 202 and coarse segmentation image 204 may be encoded in concatenated image data, which is employed as input to deep refinement network 250. The resulting concatenated image 206 is shown in FIG. 2A as the concatenation of image 202 and coarse segmentation mask 204. Deep refinement network 250 may employ the segmentation refinement model and the inputed concatenated image data (encoding concatenated image 206) to refine the coarse segmentation mask and generate a refined segmentation mask, which encodes a refined segmentation image 208. As discussed in conjunction with at least FIG. 2B, the refinement of the coarse segmentation mask may be iterative. In such embodiments, image and mask scaler 246 may be employed to perform resizing and/or rescaling operations on image data (e.g., the course image data and corresponding segmentation masks). Refinement segmentation engine 240 may output the refined segmentation mask and/or the corresponding encoded refined segmentation image 208. Note that refined segmentation image 208 is more refined (e.g., less "fuzzy") than the coarse segmentation image 204. Thus, the refined segmentation mask is more accurate than the coarse segmentation mask.

In various embodiments, the refinement segmentation engine 240 may employ the refined segmentation mask to generate a segmentation of the visually depicted object (e.g., the jogger). The segmentation of the visually depicted object may be generated by applying a segmentation operation (e.g., a masking operation) via the source image and the refined segmentation mask. The segmentation of the visually depicted object may be provided via segmented image data and/or a segmented image encoded by the segmented image data. In at least one embodiment, the refined segmentation mask may also be provided.

FIG. 2B illustrates that the refinement segmentation engine 240 may further refine the refined segmentation mask via an iterative refinement process. In a next iteration of the refinement process, the refined segmentation (encoding refined segmentation image 208) may be treated as the coarse segmentation mask (encoding coarse segmentation image 204). The iterative refinement process may include a coarse-to-fine multi-level approach. At each iteration, the source image and the segmentation mask may be resized and/or rescaled. The first iteration of the process may employ a resized source image data and coarse segmentation mask. The resized source image data and the coarse segmentation mask may have a lower (or smaller) resolution than the originally received source image data and the coarse segmentation mask. That is, the source image data and the coarse segmentation mask may be compressed to a lower resolution. At each iteration, the resolution of the source image data may be increased, such that segmentation refinement engine can refine greater and greater levels of details in the semantic segmentation process. The iterations (and resizing of the image data) may continue until the refinement of the segmentation mask converges to an acceptable level of accuracy.

In FIG. 2B, the source image data (encoding source image 202) and the coarse segmentation mask (encoding coarse segmentation image 204) are initially received. The source image and the coarse segmentation mask may be of a first image resolution. In a non-limiting embodiment, the first resolution may be 1024×1024. In a first iteration of the iterative refinement process, the image and mask scaler 246 may generate downsized image data that encodes a downsized image 212 of the source image 202. The downsized image 212 may be of a second image resolution that is less than the first image resolution of the source image 202. In a non-limiting embodiment, the second resolution may be 320×320. The image and mask scaler 246 may also generate a downsized segmentation mask (encoding downsized segmentation image 214) by downsizing the coarse segmentation mask (encoding coarse segmentation image 204). The downsized segmentation mask may also be of the second image resolution.

The image and mask concatenator 244 may generate a concatenation of the downsized image data and the downsized segmentation mask. The deep refinement network 250 may employ the segmentation refinement model to generate a first intermediate segmentation mask (encoding first intermediate segmentation imager 218) based on the concatenation of the downsized image data and the downsized segmentation mask. The first intermediate segmentation mask may be of the second image resolution.

In a second iteration of the iterative refinement process, the image and mask scaler 246 may generate midsized image data that encodes a midsized image 222 of the source image based on an upsizing operation of the downsized image 212. The midsized image may be of a third image resolution that is less than the first image resolution of the source image and greater than the second image resolution of the downsized image. In a non-limiting embodiment, the third resolution may be 640×640. The image and mask scaler 246 may also generate a midsized segmentation mask (encoding midsized segmentation image 224) via an upsizing operation on the first intermediate segmentation mask. The midsized segmentation mask may be of the third image resolution. The image and mask concatenator 244 may generate a concatenation of the midsized image data and the midsized segmentation mask may. The deep refinement network 250 may employ the segmentation refinement model to generate a second intermediate segmentation mask (encoding second intermediate segmentation image 228) based on the concatenation of the midsized image data and the midsized segmentation mask. The second intermediate segmentation mask may be of the third image resolution. The image and mask scaler 246 may generate the refined segmentation mask (encoding refined segmentation image 238) based on an upsizing operation of the second intermediate segmentation mask. The resolution of the refined segmentation mask may be of the first resolution.

Supervised Machine Learning for Training a Segmentation Refinement Engine

FIG. 3 illustrates non-limiting exemplary architectures and operations of an enhanced refinement segmentation trainer 380 for training a segmentation refinement model, in accordance with the various embodiments. Refinement segmentation trainer 380 may employ various patch-based supervised machine learning (ML) methods to train the segmentation refinement method.

Refinement segmentation trainer 280 may be similar to refinement segmentation trainer 180 of FIG. 1. To train the segmentation refinement model, refinement segmentation trainer 280 may include a difference map generator 382, a patch sampler 384, a loss function calculator 286, and a model updater 388. As such, refinement segmentation trainer may employ a patch-based enhanced supervised ML training process of the segmentation refinement model. Employing patches, rather than the entirety of the training image data may significantly reduce the computational costs of training the segmentation refinement model. The segmentation refinement model may be a neural network model that is instantiated in the weights of a neural network model. To begin training, refinement segmentation trainer 380 may initialize the segmentation refinement model. In some embodiments, initialization the segmentation refinement model may include initializing the weights (e.g., strength of connections between nodes of a neural network) to initial values. The initial values of the weights may be based on the values of weights of one or more other segmentation models, such as but not limited to another segmentation refinement model and/or a coarse segmentation model. Refinement segmentation trainer 380 may select and/or access a training image 310 and a corresponding ground-truth (GT) segmentation mask 330. The training image 310 and/or the GT segmentation mask 330 may be labelled training data.

A coarse segmentation engine, such as but not limited to coarse segmentation engine 130 of FIG. 1, may generate a corresponding coarse segmentation mask 320 based on the training image 310. In at least one embodiment, a coarse segmentation model may be employed to generate the coarse segmentation mask. Various embodiments of generating a coarse segmentation mask are discussed in conjunction with at least block 404 of process 400. The coarse segmentation mask 320 may be a training coarse segmentation mask.

Difference map generator may generate a difference map. The generation of the difference map may be based on a comparison of the training coarse segmentation mask and the GT segmentation mask. In at least one embodiment, the difference map may be a binary difference map that includes image data with a plurality of pixels. The difference map may be referenced as D, and the individual pixels of the pixel map may be referenced as $D_{ij}$, where i and j are indices for the pixels in the two dimensions of the pixel layout. Similarly, the training coarse segmentation mask 320 may be referenced as S and the pixels of the training coarse segmentation mask 320 may be referenced as $S_{ij}$. The GT segmentation mask 330 may be references as GT and the pixels of the GT segmentation mask 330 may be referenced as $GT_{ij}$. In at least one embodiment, the pixels of the binary difference map may be determined as:

$$D_{ij} = \begin{cases} 1 & \text{if } |S_{ij} - GT_{ij}| > t \\ 0 & \text{otherwise} \end{cases},$$

where t is a predefined pixel difference threshold. As discussed below, refinement segmentation trainer 380 may employ the difference map, the training coarse segmentation mask 320, the training image 310, and the GT segmentation mask 330 to update and/or train the segmentation refinement model. The "white" pixels of the difference map correspond to regions where the difference between the training coarse segmentation mask and the GT segmentation mask is greater than the predefined difference threshold. Thus, the white pixels of the difference map indicate large (as determined by the difference threshold) type I or type II errors. The "black" pixels of the difference map correspond to regions where the difference between the training coarse segmentation mask and the GT segmentation mask is less than the predefined difference threshold. As discussed below, refinement segmentation trainer 380 may employ the difference map, the training coarse segmentation mask 320, the training image 310, and the GT segmentation mask 330 to update and/or train the segmentation refinement model.

Patch sampler 384 may generate corresponding sample patches of training image 310, training coarse segmentation mask 320, and the GT segmentation mask 330 based on the difference map. That is, a sampled patch of the training image 312 is generated, a corresponding sampled patch of the training coarse segmentation mask 322 is generated, and a corresponding sampled patch of the GT segmentation mask 332 is generated. Each of the sampled patch of the training image 312, the corresponding sampled patch of the training coarse segmentation mask 322, and the corresponding sampled patch of the GT segmentation mask 332 are associated with a region of the difference map that indicates a first difference of the one or more differences between the training coarse segmentation mask 320 and the GT segmentation mask 330. The first difference is greater than the predefined difference threshold. As discussed below, refinement segmentation trainer 380 may employ each of the sampled patch of the training image 312, the corresponding sampled patch of the training coarse segmentation mask 322, and the corresponding sampled patch of the GT segmentation mask 332 to update and/or train the segmentation refinement model. By focusing the training on the patches or crops of pixel data that correspond to the biggest differences between the training coarse segmentation mask and the GT segmentation mask, significant computational resources are reduced in the training of the segmentation refinement model. Furthermore, because the training is focused on the patches that correspond to the biggest differences in the training data, when the trained model is employed to refine novel coarse segmentations masks for novel images, the trained model will be more effective in refining the areas of the novel coarse segmentation masks that include the most errors. That is, the segmentation refinement model will be more effective in refining the portions of a coarse segmentation mask that is in most need of refinement. In various embodiment, the training triplet of patches or image data crops may be referenced as $[I_c, S_c, GT_c]$, where $I_c$ represents the sampled patch (or crop) of the training image 312, $S_c$ the corresponding sampled patch (or crop) of the training coarse segmentation mask 322, and $GT_c$ the corresponding sampled patch (or crop) of the GT segmentation mask 332

Patch sampler 384 may normal the scaling, size, and/or resolution of each of the sampled patch of the training image 312, the corresponding sampled patch of the training coarse segmentation mask 322, and the corresponding sampled patch of the GT segmentation mask 332. Normalizing the size or resolution of the sampled patches $[I_c, S_c, GT_c]$ may include rescaling and/or resizing the patches to a common, standard, and/or predefined size, such as but not limited 256×256, 320×320, or 640×640. The resized sampled patch of the training image 342 and the resized corresponding sampled patch of the training coarse segmentation mask 352 are shown in FIG. 3.

The refinement segmentation trainer 380 may employ the segmentation refinement model to generate a corresponding patch of a refined segmentation mask 362. Various embodiments of generating a refined segmentation mask are discussed in conjunction with at least process 500 of FIG. 5. However, briefly here, the corresponding patch of the refined segmentation mask 362 may include generating a training refined segmentation mask that is based on a concatenation 340 of the resized sampled patch of the training image 342 and the resized corresponding sampled patch of the training coarse segmentation mask 352.

Loss function calculator 386 may determine and/or calculate a value of a loss function based on a comparison between corresponding patches of the training refined segmentation mask and the resized GT segmentation mask. Model updater 388 may update the segmentation refinement model based on the value of the value of the loss function. Updating the segmentation refinement segmentation model may include adjusting and/or updating the weights of the segmentation refinement model. For example, backpropagation methods may be employed to update the weights of the segmentation refinement model. The backpropagation methods may include determining the Jacobian of the loss function and adjusting the weights accordingly.

Model updater 288 may determine whether the segmentation refinement model has converged to a desired accuracy level. If so, refinement segmentation trainer may provide the converged segmentation refinement model. If not, refinement segmentation trainer may select and/or access additional labeled training data for further supervised training of the segmentation refinement model.

Generalized Processes for Semantic Segmentation of Images

Figure 4:
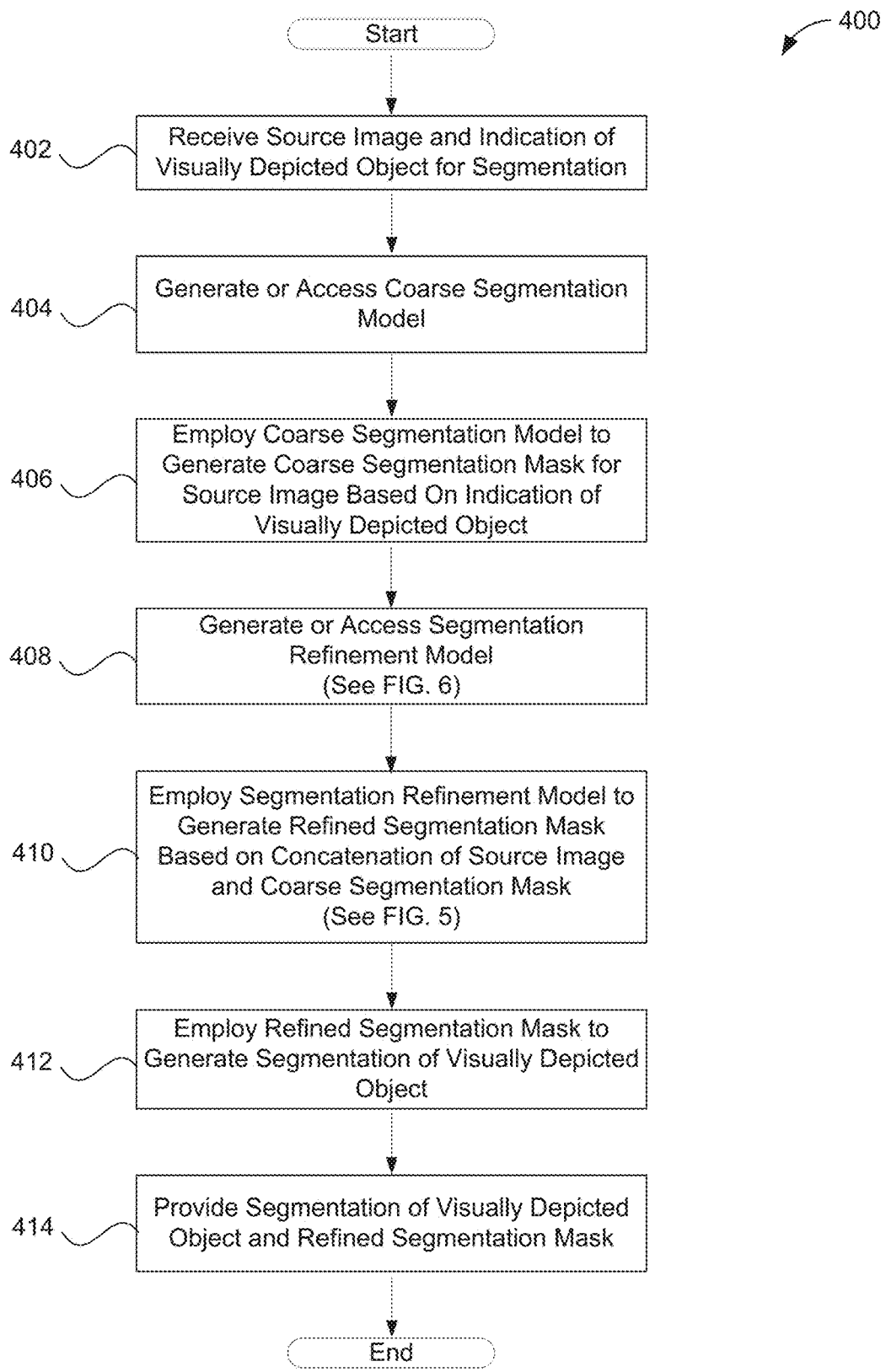
FIG. 4 illustrates one embodiment of an enhanced process for semantically segmenting an image, which is consistent with the various embodiments presented herein.
Figure 5:
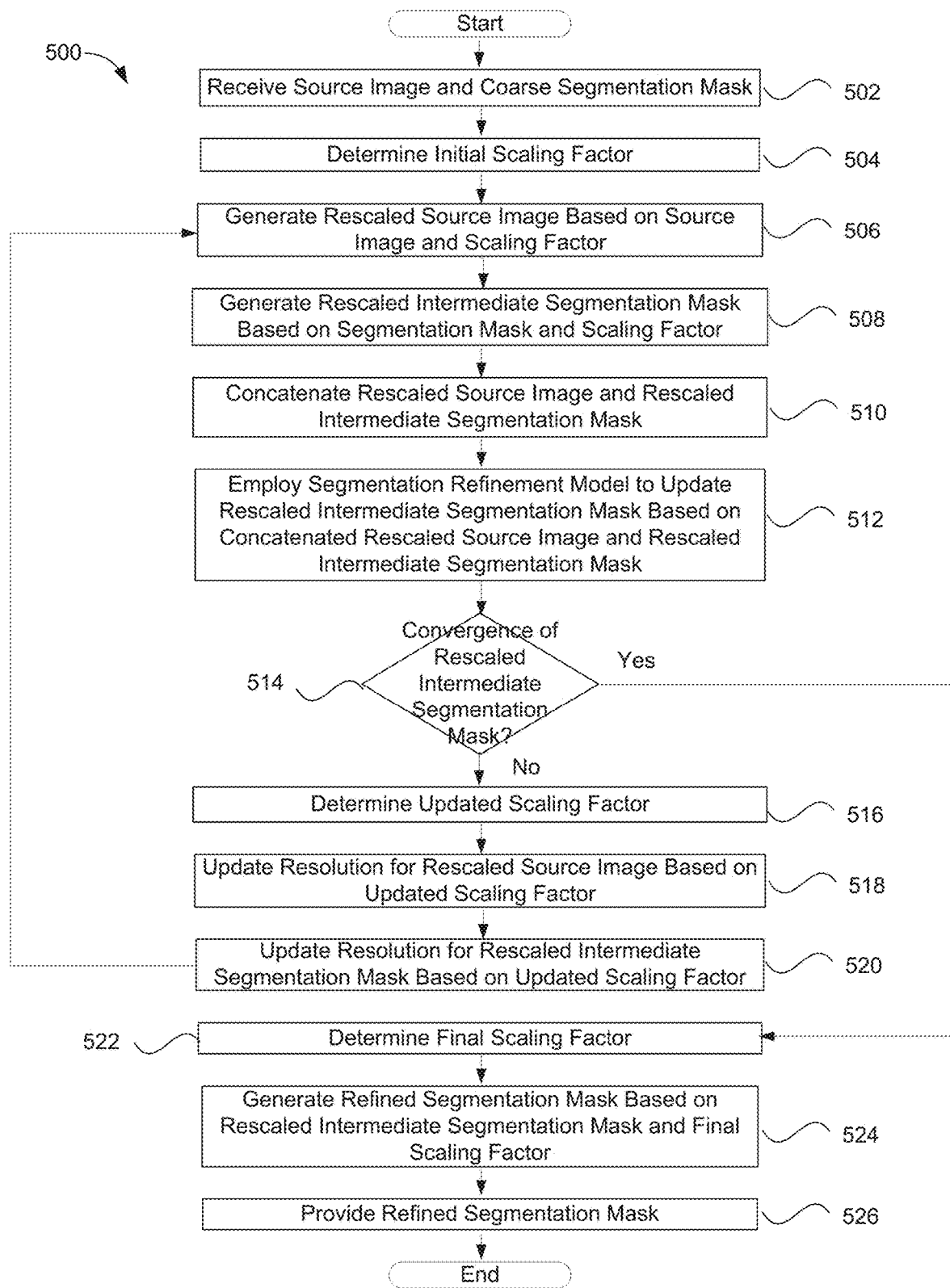
FIG. 5 illustrates one embodiment of an enhanced process for semantically segmenting an image, which is consistent with the various embodiments presented herein.
Figure 6:
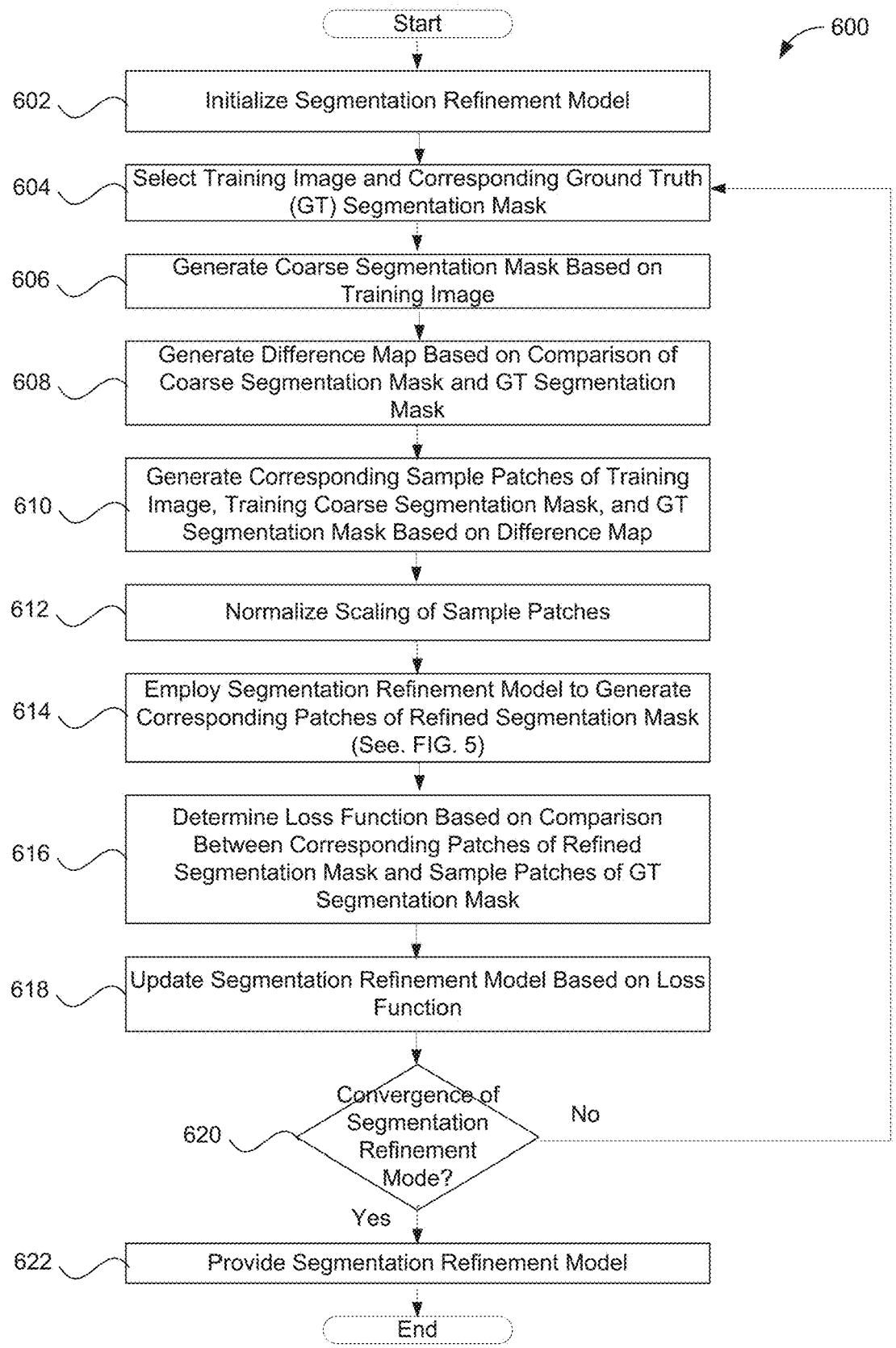
FIG. 6 illustrates one embodiment of an enhanced process for training a segmentation refinement model, which is consistent with the various embodiments presented herein.
Figure 7:
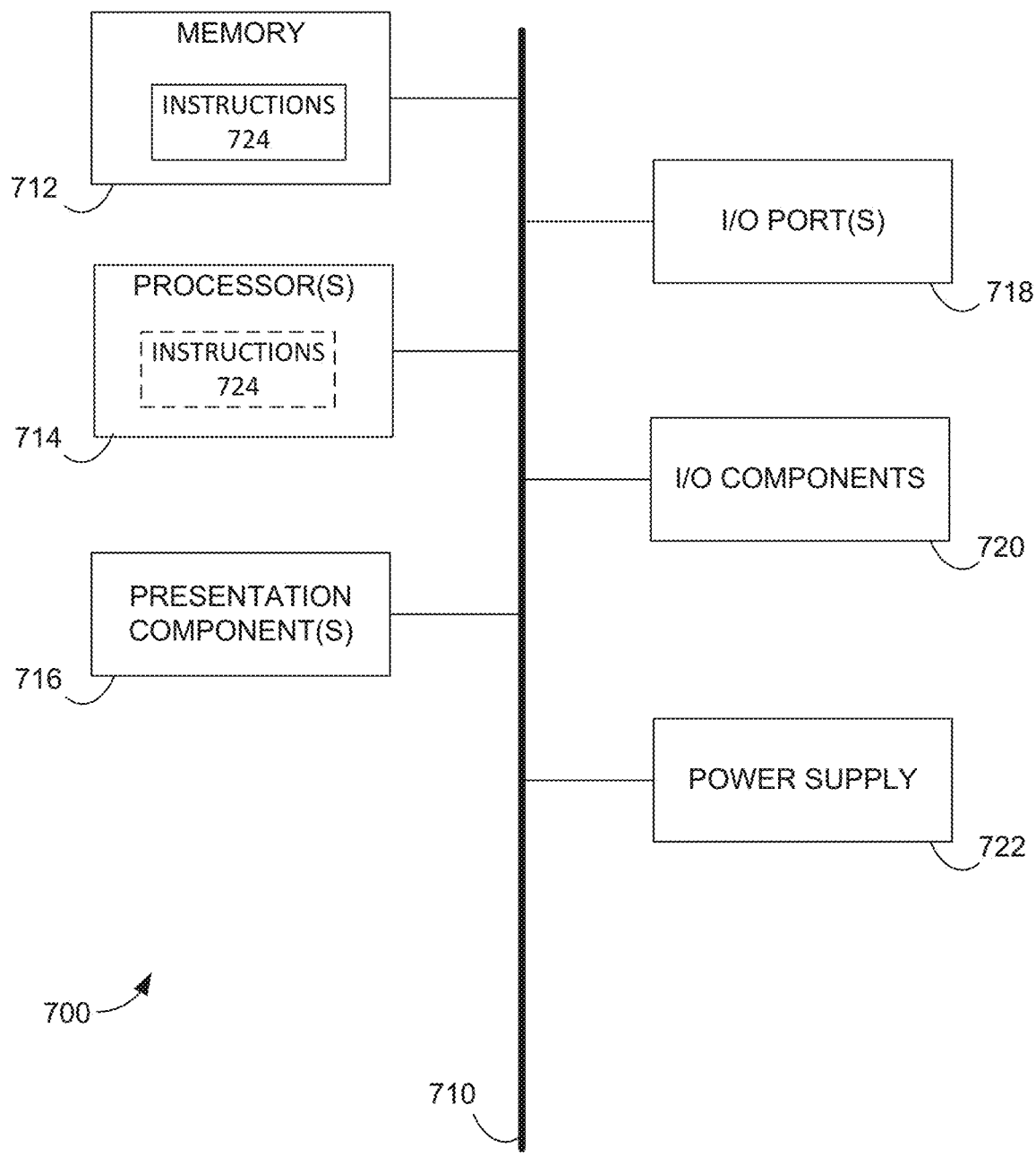
FIG. 7 is a block diagram of an example computing device in which embodiments of the present disclosure may be employed.

Processes 400, 500, and 600 of FIG. 4, FIG. 5, and FIG. 6 respectively, or portions thereof, may be performed and/or executed by any computing device, such as but not limited to computing devices 102-110 of FIG. 1, as well as computing device 700 of FIG. 7. Additionally, a refinement segmentation engines, such as but not limited to refinement segmentation engine 140 of FIG. 1 and/or refinement segmentation engine 240 of FIG. 2A, may perform and/or execute at least portions of process 400 and/or process 500. In at least one embodiment, a refinement segmentation trainer, such as but not limited to refinement segmentation trainer 180 of FIG. 1 and/or refinement segmentation trainer 380 of FIG. 3, may perform and/or execute at least portions of process 400 and/or process 500.

FIG. 4 illustrates one embodiment of an enhanced process for semantically segmenting an image, which is consistent with the various embodiments presented herein. Process 400 begins, after a start block, at block 402, where a source image is received. The source image may be encoded in received source image data. Also, an indication to segment an object that is visually depicted in the source image may be received. For example, the source image may visually depict an individually jogging, as well as a sky, a road, and other objects. A user may provide an indication to segment the jogger from the other objects visually depicted in the source image.

At block 404, a coarse segmentation model may be generated and/or received. For example, a coarse segmentation engine, such as but not limited to coarse segmentation engine 130 of FIG. 1 and/or coarse segmentation engine 230 of FIG. 2A may be configured with a coarse segmentation model. The coarse segmentation model may be selected from a plurality of available coarse segmentation models based on the source image and/or a type/classification of the object to segment. In at least one embodiment, if an adequate coarse segmentation model is not available, a coarse segmentation model may be generated via one or more training and/or machine learning (ML) methods. At block 406, the coarse segmentation model may be employed to generate a coarse (or raw) segmentation mask for the source image. The coarse segmentation mask may be based on the source image data and the indication of which visually depicted object (or type/classification of object) to segment. In at least one embodiment, a coarse segmentation engine may generate the coarse segmentation mask.

At block 408, a segmentation refinement model may be generated or accessed. Various embodiments of generating a segmentation refinement model via training the model are discussed in conjunction with at least FIG. 6. In some embodiments, each of the coarse segmentation model and/or the segmentation refinement model may be generated and/or trained prior to the execution of method 400. In some embodiments, the accessed segmentation refinement model may be selected from a plurality of segmentation refinement models based on the source image data and/or the type/classification of the object to be segmented.

At block 410, the segmentation refinement model may be employed to generate a refined segmentation mask. Various embodiments for generating a refined segmentation mask are discussed in conjunction with at least process 500 of FIG. 5. However, briefly here, the refined segmentation mask may be generated based on a concatenation of the source image data and the coarse segmentation mask. As discussed throughout, the refinement process may be an iterative refinement process that includes rescaling and/or resizing operations on the source image data, the coarse segmentation masks, and the iteratively updated refined segmentation mask. At block 412, the refined segmentation mask may be employed to generate a segmentation of the visually depicted object. At block 414, the segmentation of the visually depicted object is provided. In at least one embodiment, the refined segmentation mask may also be provided.

FIG. 5 illustrates one embodiment of an enhanced process for semantically segmenting an image, which is consistent with the various embodiments presented herein. Process 500 begins, after a start block, at block 502, where a source image (or encoding source image data) and a coarse segmentation mask are received. The source image and the coarse segmentation mask may be of an initial and/or original resolution and/or size. In a non-limiting example, the initial resolution of source image and the segmentation mask may be equivalent, e.g., 2436×1124. At block 504, an initial scaling factor may be determined. The initial scaling factor may be a downsizing scaling factor. The initial scaling factor may be a minimum scaling factor. In one non-limiting embodiment, the initial scaling factor may be: 2436→320× 1124→320. At block 506, the source image data may be rescaled to generate a rescaled source image based on the scaling factor. For example, the source image data may be rescaled, such that the rescaled source image has a resolution of 320×320. At block 508, the coarse (or intermediate) segmentation mask may be rescaled to generate a rescaled intermediate segmentation mask based on the scaling factor. For example, the coarse (or intermediate) segmentation mask may be rescaled, such that the coarse (or intermediate) segmentation mask has a resolution of 320×320.

At block 510, the rescaled source image data and the rescaled coarse (or intermediate) segmentation mask may be concatenated. At block 512, a segmentation refinement model may be employed to update the rescaled intermediate segmentation mask based on the concatenated rescaled source image and the rescaled intermediated segmentation mask. After the rescaled intermediate segmentation block has been updated at block 512, decision block 514, it is determined whether the refinement process for the rescaled intermediated segmentation mask has converged to a predefined level of accuracy. If so, process 500 flows to block 522. If the intermediate segmentation mask has not converged to the desired accuracy level, process 500 may flow to block 516.

At block 516, an updated scaling factor is determined. The updated scaling factor may be an upsizing scaling factor. In a non-limiting embodiment, the updated scaling factor may be: 320→640×320→640. At block 518, the resolution (or scaling) of the rescaled source image may be updated based on the updated scaling factor. At block 520, the resolution (or scaling) of the rescaled intermediate segmentation mask may be updated based on the updated scaling factor. For example, at blocks 518 and 520, the updated rescaled source image data and the updated intermediate segmentation mask may be rescaled to a resolution of 620×640. Process 500 may return to block 506 to perform another iteration in the iterative updating of the refined (or intermediate) segmentation mask.

At block 522, a final scaling factor may be determined. In at least one embodiment, the final scaling factor may be the original and/or initial scaling factor for the source image data, e.g., 2436×1124. At block 524, a refined segmentation mask may be generated based on the rescaled intermediated segmentation mask and the final scaling factor. For example, the rescaled intermediate segmentation mask may be rescaled based on the final scaling factor. In at least one embodiment, the rescaled intermediate segmentation mask may be rescaled such that the refined segmentation mask have the same resolution as the initial resolution of the source image. At block 526, the refined segmentation mask may be proved.

FIG. 6 illustrates one embodiment of an enhanced process for training a segmentation refinement model, which is consistent with the various embodiments presented herein. Process 600 may be a patch-based enhanced supervised machine learning (ML) training process of the segmentation refinement model. The segmentation refinement model may be a neural network model that is instantiated in the weights of a neural network model. Process 600 begins, after a start block, at block 602 where a segmentation refinement model may be initialized. In some embodiments, initialization the segmentation refinement model may include initializing the weights (e.g., strength of connections between nodes of a neural network) to initial values. The initial values of the weights may be based on the values of weights of one or more other segmentation models, such as but not limited to another segmentation refinement model and/or a coarse segmentation model. At block 604, a training image and a corresponding ground-truth (GT) segmentation mask may be selected and/or accessed. The training image and/or the GT segmentation mask may be labelled training data.

At block 606, a corresponding coarse segmentation mask may be generated based on the training image. In at least one embodiment, a coarse segmentation model may be employed to generate the coarse segmentation mask. Various embodiments of generating a coarse segmentation mask are discussed in conjunction with at least block 404 of process 400. The coarse segmentation mask generated at block 606 may be a training coarse segmentation mask. At block 608, a difference map may be generated. The generation of the difference map may be based on a comparison of the training coarse segmentation mask and the GT segmentation mask. As discussed below, process 600 may employ the difference map, the training coarse segmentation mask, the training image, and the GT segmentation mask to update and/or train the segmentation refinement model.

At block 610, corresponding sample patches of training image, training coarse segmentation mask, and the GT segmentation mask are generated based on the difference map. That is, a sampled patch of the training image is generated, a corresponding sampled patch of the training coarse segmentation mask is generated, and a corresponding sampled patch of the GT segmentation mask is generated. Each of the sampled patch of the training image, the corresponding sampled patch of the training coarse segmentation mask, and the corresponding sampled patch of the GT segmentation mask are associated with a region of the difference map that indicates a first difference of the one or more differences between the training coarse segmentation mask and the GT segmentation mask. The first difference may be greater than a predefined difference threshold. As discussed below, process 600 may employ each of the sampled patch of the training image, the corresponding sampled patch of the training coarse segmentation mask, and the corresponding sampled patch of the GT segmentation mask to update and/or train the segmentation refinement model.

At block 612, the scaling, size, and/or resolution of each of the sampled patch of the training image, the corresponding sampled patch of the training coarse segmentation mask, and the corresponding sampled patch of the GT segmentation mask may be normalized. Normalizing the size or resolution of the sampled patches may include rescaling and/or resizing the patches to a common, standard, and/or predefined size, such as but not limited 256×256, 320×320, or 640×640. At block 614, the segmentation refinement model may be employed to generate corresponding patches of a refined segmentation mask. Various embodiments of generating a refined segmentation mask are discussed in conjunction with at least process 500 of FIG. 5. However, briefly here, the corresponding patches of the refined segmentation mask may include a training refined segmentation mask that is based on a concatenation of the resized sampled patch of the training image and the resized corresponding sampled patch of the training coarse segmentation mask.

At block 616, a value of a loss function is determined based on a comparison between corresponding patches of the training refined segmentation mask and the resized GT segmentation mask. At block 618, the segmentation refinement model may be updated based on the value of the value of the loss function. Updating the segmentation refinement segmentation model may include adjusting and/or updating the weights of the segmentation refinement model. For example, backpropagation methods may be employed to update the weights of the segmentation refinement model. The backpropagation methods may include determining the Jacobian of the loss function and adjusting the weights accordingly.

At decision block 620, it is determined whether the segmentation refinement model has converged to a desired accuracy level. If so, process 600 may flow to block 622. If not, process 600 may return to block 604 for further supervised training of the segmentation refinement model. At block 622, the converged segmentation refinement model may be provided. Providing the converged segmentation refinement model may include storing the segmentation refinement model of the database of segmentation refinement models 128 of FIG. 1.

Illustrative Computing Device

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 may be non-transitory memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for semantic segmentation, which, when executed by a processor of a computing device cause the computing device to perform actions comprising:
    receiving source image data that encodes a source image, wherein the source image data includes a set of pixels and a first subset of the set of pixels is associated with a visual depiction of an object within the source image;
    generating a course segmentation mask that coarsely segments the source image data by identifying a second subset of the set of pixels, wherein the second subset of pixels is a coarse approximation of the first subset of pixels, and wherein the source image and the coarse segmentation mask are of a first image resolution;
    using a segmentation refinement model to generate a first intermediate segmentation mask based on a concatenation of downsized image data and a downsized segmentation mask, wherein the first intermediate segmentation mask is of a second image resolution; and
    using the segmentation refinement model to iteratively generate a refined segmentation mask based on an upsizing operation of the first intermediate segmentation mask and on a concatenation of the source image data and the coarse segmentation mask, wherein the refined segmentation mask is employed to finely segment the source image data by identifying a third subset of the set of pixels, and wherein the third subset of pixels is a closer approximation of the first subset of pixels than the coarse approximation of the second subset of pixels, and wherein the refined segmentation mask is of the first image resolution.

2. The computer-readable storage medium of claim 1, wherein using the segmentation refinement model to iteratively generate the refined segmentation mask comprises:
    generating the downsized image data that encodes a downsized image of the source image, wherein the downsized image is of a second image resolution that is less than the first image resolution of the source image;
    generating the downsized segmentation mask by downsizing the coarse segmentation mask, wherein the downsized segmentation mask is of the second image resolution; and
    generating the concatenation of the downsized image data and the downsized segmentation mask.

3. The computer-readable storage medium of claim 1, wherein generating the refined segmentation mask based on the upsizing operation on the first intermediate segmentation mask comprises:
    generating midsized image data that encodes a midsized image of the source image, wherein the midsized image is of a third image resolution that is less than the first image resolution of the source image and greater than the second image resolution of the downsized image;
    generating a midsized segmentation mask via the upsizing operation on the first intermediate segmentation mask, wherein the midsized segmentation mask is of the third image resolution;
    generating a concatenation of the midsized image data and the midsized segmentation mask;
    using the segmentation refinement model to generate a second intermediate segmentation mask based on the concatenation of the midsized image data and the midsized segmentation mask, wherein the second intermediate segmentation mask is of the third image resolution; and
    generating the refined segmentation mask based on an upsizing operation on the second intermediate segmentation mask.

4. The computer readable storage medium of claim 1, wherein the segmentation refinement model is implemented by a convolutional encoder-decoder neural network.

5. The one or more computer-readable storage medium of claim 1, wherein the actions further include:
    accessing a training image and a corresponding ground-truth (GT) segmentation mask;
    using a coarse segmentation model to generate a training coarse segmentation mask for the training image;
    generating a difference map based on a comparison of the training coarse segmentation mask and the GT segmentation mask, wherein the difference map indicates one or more differences between the training coarse segmentation mask and the GT segmentation mask; and
    using the difference map, the training coarse segmentation mask, the training image, and the GT segmentation mask to update the segmentation refinement model.

6. The one or more computer-readable storage media of claim 5, wherein using the difference map, the training coarse segmentation mask, the training image, and the GT segmentation mask to update the segmentation refinement model comprises:
    generating a sampled patch of the training image, a corresponding sampled patch of the training coarse segmentation mask, and a corresponding sampled patch of the GT segmentation mask, wherein each of the sampled patch of the training image, the corresponding sampled patch of the training coarse segmentation mask, and the corresponding sampled patch of the GT segmentation mask are associated with a region of the difference map that indicates a first difference of the one or more differences between the training coarse segmentation mask and the GT segmentation mask, wherein the first difference is greater than a predefined difference threshold; and
    using the sampled patch of the training image, the corresponding sampled patch of the training coarse segmentation mask, and the corresponding sampled patch of the GT segmentation mask to update the segmentation refinement model.

7. The one or more computer-readable storage media of claim 6, wherein using the sampled patch of the training image, the corresponding sampled patch of the training coarse segmentation mask, and the corresponding sampled patch of the GT segmentation mask to train the segmentation refinement model comprises:
    resizing each of the sampled patch of the training image, the corresponding sampled patch of the training coarse segmentation mask, and the corresponding sampled patch of the GT segmentation mask to a predefined size;

using the segmentation refinement model to generate a training refined segmentation mask, based on a concatenation of the resized sampled patch of the training image and the resized corresponding sampled patch of the training coarse segmentation mask;

determining a value of a loss function based on a comparison of the training refined segmentation mask and the resized corresponding sampled patch of the GT segmentation mask; and updating the segmentation refinement model based on the value of the loss function.

8. A method for segmenting an object that is visually depicted via a first subset of a set of pixels of a source image that is encoded by source image data, the method comprising:

steps for receiving a coarse segmentation mask that coarsely segments the object by identifying a second subset of the set of pixels, wherein the second subset of pixels is a coarse approximation of the first subset of pixels, and wherein the source image and the coarse segmentation mask are of a first image resolution;

steps for using a segmentation refinement model to generate a first intermediate segmentation mask based on a concatenation of downsized image data and a downsized segmentation mask, wherein the downsized image data, the downsized segmentation mask, and the first intermediate segmentation mask is of the second image resolution; and steps for generating a refined segmentation mask based on an upsizing operation on the first intermediate segmentation mask, the segmentation refinement model, and a concatenation of the source image and the coarse segmentation mask, wherein the refined segmentation mask is of the first image resolution; and steps for using the refined segmentation mask to finely segment the source image by identifying a third subset of the set of pixels, wherein the third subset of pixels is a closer approximation of the first subset of pixels than the coarse approximation of the second subset of pixels.

9. The method for claim 8, wherein the steps for generating a refined segmentation mask comprise:

steps for generating downsized image data that encodes a downsized image of the source image; and steps for generating a downsized segmentation mask by downsizing the coarse segmentation mask.

10. The method of claim 8, wherein the steps for generating the refined segmentation mask comprise:

steps for generating midsized image data that encodes a midsized image of the source image, wherein the midsized image is of a third image resolution that is less than the first image resolution of the source image and greater than the second image resolution of the downsized image;

steps for generating a midsized segmentation mask via the upsizing operation on the first intermediate segmentation mask, wherein the midsized segmentation mask is of the third image resolution;

steps for generating a concatenation of the midsized image data and the midsized segmentation mask;

steps for using the segmentation refinement model to generate a second intermediate segmentation mask based on the concatenation of the midsized image data and the midsized segmentation mask, wherein the second intermediate segmentation mask is of the third image resolution; and steps generating the refined segmentation mask based on an upsizing operation on the second intermediate segmentation mask.

11. The method of claim 8, further comprising:

steps for accessing a training image and a corresponding ground-truth (GT) segmentation mask;

steps for using a coarse segmentation model to generate a training coarse segmentation mask for the training image;

steps for generating a difference map based on a comparison of the training coarse segmentation mask and the GT segmentation mask, wherein the difference map indicates one or more differences between the training coarse segmentation mask and the GT segmentation mask; and steps for using the difference map, the training coarse segmentation mask, the training image, and the GT segmentation mask to train the segmentation refinement model.

12. The method of claim 11, wherein steps for using the difference map, the training coarse segmentation mask, the training image, and the GT segmentation mask to train the segmentation refinement model comprise:

steps for generating a sampled patch of the training image, a corresponding sampled patch of the training coarse segmentation mask, and a corresponding sampled patch of the GT segmentation mask, wherein each of the sampled patch of the training image, the corresponding sampled patch of the training coarse segmentation mask, and the corresponding sampled patch of the GT segmentation mask are associated with a region of the difference map that indicates a first difference of the one or more differences between the training coarse segmentation mask and the GT segmentation mask, wherein the first difference is greater than a predefined difference threshold; and steps for using the sampled patch of the training image, the corresponding sampled patch of the training coarse segmentation mask, and the corresponding sampled patch of the GT segmentation mask to train the segmentation refinement model.

13. The method of claim 12, wherein steps for using the sampled patch of the training image, the corresponding sampled patch of the training coarse segmentation mask, and the corresponding sampled patch of the GT segmentation mask to train the segmentation refinement model comprises:

steps for resizing each of the sampled patch of the training image, the corresponding sampled patch of the training coarse segmentation mask, and the corresponding sampled patch of the GT segmentation mask to a predefined size;

steps for using the segmentation refinement model to generate a training refined segmentation mask, based on a concatenation of the resized sampled patch of the training image and the resized corresponding sampled patch of the GT segmentation mask;

steps for determining a loss function based on a comparison of the training refined segmentation mask and the resized corresponding sampled patch of the training coarse segmentation mask; and steps for updating the segmentation refinement model based on the loss function.

14. A computing system for semantic segmentation, comprising:

a processor device; and a computer-readable storage medium, coupled with the processor device, having instructions stored thereon, which, when executed by the processor device, perform actions comprising:

generating a difference map based on a comparison of a training coarse segmentation mask and a ground-truth (GT) segmentation mask corresponding to a training image, wherein the difference map indicates one or more differences between the training coarse segmentation mask and the GT segmentation mask;

using the difference map, the training coarse segmentation mask, the training image, and the GT segmentation mask to train a segmentation refinement model;

receiving source image data that encodes a source image, wherein the source image data includes a set of pixels and a first subset of the set of pixels is associated with a visual depiction of an object within the source image;

generating a coarse segmentation mask that coarsely segments the source image data by identifying a second subset of the set of pixels, wherein the second subset of pixels is a coarse approximation of the first subset of pixels; and using the segmentation refinement model to iteratively generate a refined segmentation mask based on a concatenation of the source image data and the coarse segmentation mask, wherein the refined segmentation model is employed to finely segment the source image data by identifying a third subset of the set of pixels, wherein the third subset of pixels is a closer approximation of the first subset of pixels than the coarse approximation of the second subset of pixels.

15. The computing system of claim 14, wherein the source image and the coarse segmentation mask are of a first image resolution and using the segmentation model to iteratively generate the refined segmentation mask comprises:

generating downsized image data that encodes a downsized image of the source image, wherein the downsized image is of a second image resolution that is less than the first image resolution of the source image;

generating a downsized segmentation mask by downsizing the coarse segmentation mask, wherein the downsized segmentation mask is of the second image resolution;

generating a concatenation of the downsized image data and the downsized segmentation mask;

using the segmentation refinement model to generate a first intermediate segmentation mask based on the concatenation of the downsized image data and the downsized segmentation mask, wherein the first intermediate segmentation mask is of the second image resolution; and generating the refined segmentation mask based on an upsizing operation on the first intermediate segmentation mask, wherein the refined segmentation mask is of the first image resolution.

16. The computing system of claim 15, wherein generating the refined segmentation mask based on the upsizing operation on the first intermediate segmentation mask comprises:

generating midsized image data that encodes a midsized image of the source image, wherein the midsized image is of a third image resolution that is less than the first image resolution of the source image and greater than the second image resolution of the downsized image;

generating a midsized segmentation mask via the upsizing operation on the first intermediate segmentation mask, wherein the midsized segmentation mask is of the third image resolution;

generating a concatenation of the midsized image data and the midsized segmentation mask;

using the segmentation refinement model to generate a second intermediate segmentation mask based on the concatenation of the midsized image data and the midsized segmentation mask, wherein the second intermediate segmentation mask is of the third image resolution; and generating the refined segmentation mask based on an upsizing operation on the second intermediate segmentation mask.

17. The computing system of claim 14, wherein the segmentation refinement model is implemented by a convolutional encoder-decoder neural network.

18. The computing system of claim 14, wherein the actions further include using a coarse segmentation model to generate the training coarse segmentation mask for the training image.

19. The computing system of claim 14, wherein using the difference map, the training coarse segmentation mask, the training image, and the GT segmentation mask to train the segmentation refinement model comprises:

generating a sampled patch of the training image, a corresponding sampled patch of the training coarse segmentation mask, and a corresponding sampled patch of the GT segmentation mask, wherein each of the sampled patch of the training image, the corresponding sampled patch of the training coarse segmentation mask, and the corresponding sampled patch of the GT segmentation mask are associated with a region of the difference map that indicates a first difference of the one or more differences between the training coarse segmentation mask and the GT segmentation mask, wherein the first difference is greater than a predefined difference threshold; and using the sampled patch of the training image, the corresponding sampled patch of the training coarse segmentation mask, and the corresponding sampled patch of the GT segmentation mask to train the segmentation refinement model.

20. The computing system of claim 19, wherein using the sampled patch of the training image, the corresponding sampled patch of the training coarse segmentation mask, and the corresponding sampled patch of the GT segmentation mask to train the segmentation refinement model comprises:

resizing each of the sampled patch of the training image, the corresponding sampled patch of the training coarse segmentation mask, and the corresponding sampled patch of the GT segmentation mask to a predefined size;

using the segmentation refinement model to generate a training refined segmentation mask, based on a concatenation of the resized sampled patch of the training image and the resized corresponding sampled patch of the training coarse segmentation mask;

determining a loss function based on a comparison of the training refined segmentation mask and the resized corresponding sampled patch of the GT segmentation mask; and updating the segmentation refinement model based on the loss function.

* * * * *